(12) United States Patent
Lee et al.

(10) Patent No.: US 10,592,720 B2
(45) Date of Patent: *Mar. 17, 2020

(54) DIGITAL DEVICE AND BIOMETRIC AUTHENTICATION METHOD THEREIN

(71) Applicant: LG ELECTRONICS INC., Seoul (KR)

(72) Inventors: Chaedeok Lee, Seoul (KR); Seonghong Park, Seoul (KR); Junhak Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 57 days.

This patent is subject to a terminal disclaimer.

(21) Appl. No.: 15/878,211

(22) Filed: Jan. 23, 2018

(65) Prior Publication Data

US 2019/0095681 A1 Mar. 28, 2019

(30) Foreign Application Priority Data

Sep. 22, 2017 (KR) .................. 10-2017-0122241

(51) Int. Cl.
*G06F 21/31* (2013.01)
*G06K 9/00* (2006.01)
(Continued)

(52) U.S. Cl.
CPC ......... *G06K 9/00033* (2013.01); *G06F 21/32* (2013.01); *G06K 9/00087* (2013.01);
(Continued)

(58) Field of Classification Search
CPC ................ G06F 21/32; G06K 9/00087; G06K 2009/0006; G06K 2009/00932;
(Continued)

(56) References Cited

U.S. PATENT DOCUMENTS 5,899,863 A * 5/1999 Hatfield .................. A61B 8/06
128/916
6,311,085 B1 * 10/2001 Meaney ................. A61B 5/055
600/420

(Continued)

FOREIGN PATENT DOCUMENTS

JP 2008-52317 A 3/2008
KR 10-2004-0048114 A 6/2004
(Continued)

*Primary Examiner* — Philip P. Dang
(74) *Attorney, Agent, or Firm* — Birch, Stewart, Kolasch & Birch, LLP

(57) ABSTRACT

A digital device including a camera unit; and a controller configured to in response to a request to execute a first application on the digital device having a first security authentication level, control the camera unit to capture first vein image data at a first depth of a particular body part of a target and perform a first authentication process by comparing the captured first vein image data with prestored first vein image data, and in response to a request to execute a second application on the digital device having a second security authentication level more secure than the first authentication level, control the camera unit to capture second vein image data at a second depth of the particular body part of the target and perform the first authentication process and a second authentication process by comparing the captured second vein image data with prestored second vein image data.

13 Claims, 20 Drawing Sheets

(51) Int. Cl.
- *G06F 21/32* (2013.01)
- *H04N 5/232* (2006.01)
- *H04N 5/33* (2006.01)
- *G06K 9/20* (2006.01)
- *H04N 5/225* (2006.01)

(52) U.S. Cl.
CPC ..... *G06K 9/00255* (2013.01); *G06K 9/00288* (2013.01); *G06K 9/00885* (2013.01); *G06K 9/2018* (2013.01); *H04N 5/232* (2013.01); *H04N 5/23212* (2013.01); *H04N 5/23296* (2013.01); *H04N 5/33* (2013.01); *G06K 2009/0006* (2013.01); *G06K 2009/00932* (2013.01); *H04N 5/2256* (2013.01)

(58) Field of Classification Search
CPC ........... G06K 9/00033; G06K 9/00288; G06K 9/00255; H04N 5/2256; H04N 5/23212; H04N 5/33

See application file for complete search history.

(56) References Cited

U.S. PATENT DOCUMENTS

| | | | | |
|---|---|---|---|---|
| 6,488,377 | B2 * | 12/2002 | Matsumoto | A61B 3/145 351/206 |
| 7,550,707 | B2 * | 6/2009 | Hashimoto | G06K 9/20 250/221 |
| 7,944,498 | B2 * | 5/2011 | Sung | G02B 7/38 348/252 |
| 8,223,199 | B2 * | 7/2012 | Kiyomizu | G06K 9/00 348/61 |
| 8,280,484 | B2 * | 10/2012 | Boyden | A61B 5/02007 356/432 |
| 8,488,050 | B2 * | 7/2013 | Ueda | G03B 13/36 348/333.04 |
| 8,724,857 | B2 * | 5/2014 | Derakhshani | G06K 9/00597 382/117 |
| 8,811,690 | B2 * | 8/2014 | Dumont | G06K 9/00 382/127 |
| 8,839,720 | B2 * | 9/2014 | Stewart | F41A 17/066 102/301 |
| 8,850,535 | B2 * | 9/2014 | Liberman | H04L 9/3231 726/6 |
| 8,850,536 | B2 * | 9/2014 | Liberman | H04L 9/0866 713/186 |
| 8,995,726 | B2 * | 3/2015 | Amano | G06K 9/00885 382/115 |
| 9,100,825 | B2 * | 8/2015 | Schultz | H04W 12/06 |
| 9,323,912 | B2 * | 4/2016 | Schultz | G06F 21/32 |
| 9,345,427 | B2 * | 5/2016 | Wood | A61B 5/0059 |
| 9,408,530 | B2 * | 8/2016 | Ferren | A61B 1/041 |
| 9,417,188 | B2 * | 8/2016 | Ishihara | A61B 1/00009 |
| 9,553,859 | B2 * | 1/2017 | Slaby | H04L 63/08 |
| 9,588,046 | B2 * | 3/2017 | Ishihara | A61B 1/00009 |
| 9,672,471 | B2 * | 6/2017 | Boyden | A61B 5/02007 |
| 9,805,214 | B2 * | 10/2017 | Sahu | H04W 12/0013 |
| 9,811,299 | B2 * | 11/2017 | Nobutani | G06F 21/32 |
| 10,002,242 | B2 * | 6/2018 | Jakobsson | H04L 63/0861 |
| 10,007,831 | B2 * | 6/2018 | Semba | G06K 9/00087 |
| 10,028,676 | B2 * | 7/2018 | Freeman | G16H 50/20 |
| 10,121,059 | B2 * | 11/2018 | Yoo | G06K 9/00228 |
| 10,201,425 | B2 * | 2/2019 | Ku | A61F 2/2475 |
| 2007/0038118 | A1 * | 2/2007 | DePue | A61B 5/1171 600/476 |
| 2008/0107309 | A1 * | 5/2008 | Cerni | G06K 9/00033 382/115 |
| 2008/0317293 | A1 * | 12/2008 | Sakurai | G06K 9/00013 382/115 |
| 2009/0304237 | A1 * | 12/2009 | Yoshikawa | A61B 5/1172 382/116 |
| 2012/0194662 | A1 * | 8/2012 | Zhang | G06K 9/00033 348/77 |
| 2012/0300989 | A1 * | 11/2012 | Nakashima | G06K 9/00046 382/115 |
| 2016/0004917 | A1 * | 1/2016 | Yoshida | A61B 90/36 382/115 |
| 2017/0011210 | A1 * | 1/2017 | Cheong | A61B 5/0022 |
| 2017/0206332 | A1 * | 7/2017 | Piccin | G16H 50/30 |
| 2018/0014734 | A1 * | 1/2018 | Rogers | A61B 5/0048 |
| 2018/0045918 | A1 * | 2/2018 | Seo | G02B 9/60 |

FOREIGN PATENT DOCUMENTS

| | | |
|---|---|---|
| KR | 10-2007-0081773 A | 8/2007 |
| KR | 10-1550206 B1 | 9/2015 |
| KR | 10-2016-0099869 A | 8/2016 |

* cited by examiner

DIGITAL DEVICE AND BIOMETRIC AUTHENTICATION METHOD THEREIN

Pursuant to 35 U.S.C. § 119(a), this application claims the benefit of earlier filing date and right of priority to Korean Application No. 10-2017-0122241, filed on Sep. 22, 2017, the contents of which are hereby incorporated by reference herein in its entirety.

BACKGROUND OF THE INVENTION

Field of the Invention

The present invention relates to a digital device, and more particularly, to a digital device and biometric authentication method therein. Although the present invention is suitable for a wide scope of applications, it is particularly suitable for performing authentication based on a plurality of body part image data differing from each other in depth from a skin surface.

Discussion of the Related Art

Generally, when financial transactions and the like are performed using a digital device such as a mobile terminal or the like, security authentication is required. Security authentication methods include entering a security authentication password, performing personal authentication by capturing a user's specific part such as a face, a fingerprint or the like through a camera, etc. Yet, since such a security authentication method can be performed by others, it causes a problem of reduced safety.

Recently, a digital device adopting a biometric authentication system capable of performing authentication through biometric information of vein and the like has been developed. A digital device of processing biometric authentication can perform biometric authentication by obtaining a biometric image of a palm, a finger, or the like and analyzing unique biometric property of palm's vein, finger's vein or the like. Particularly, according to a vein authentication technology, infrared light of a specific wavelength is applied to a specific part of a human body, an image is photographed using an image sensor, and an image having a blood vessel pattern represented in black is then obtained. Therefore, a specific person can be authenticated by analyzing a blood vessel pattern that is different for each person.

However, since the related art vein authentication is configured with a non-contact reflective or transmissive sensor module including an image sensor and an optical system, it is difficult to downsize and reduce the costs of the sensor module. Thus, the demand for developing a digital device, which can improve safety and reliability of security authentication by performing authentication based on a plurality of body part image data differing from each other in depth from a skin surface using a 3-dimensional (3D) camera that can be downsized and low-priced, is rising.

SUMMARY OF THE INVENTION

Accordingly, embodiments of the present invention are directed to a digital device and biometric authentication method therein that substantially obviate one or more problems due to limitations and disadvantages of the related art.

One object of the present invention is to provide a digital device and biometric authentication method therein, by which personal authentication can be performed quickly and conveniently by extracting a plurality of body part vein patterns body part differing from each other in depth from a skin surface by applying ToF (time of flight) employing a near infrared light source and then using the extracted patterns.

Another object of the present invention is to provide a digital device and biometric authentication method therein, by which safety and reliability of security authentication can be improved by performing vein authentication based on a plurality of body part image data differing from each other in depth from a skin surface.

Still another object of the present invention is to provide a digital device and biometric authentication method therein, by which security can be reinforced with higher accuracy by performing vein authentication once or several times based on a plurality of body part image data differing from each other in depth from a skin surface according to a security level.

Technical tasks obtainable from the present invention are non-limited by the above-mentioned technical tasks. In addition, other unmentioned technical tasks can be clearly understood from the following description by those having ordinary skill in the technical field to which the present invention pertains. Additional advantages, objects, and features of the invention will be set forth in the disclosure herein as well as the accompanying drawings. Such aspects may also be appreciated by those skilled in the art based on the disclosure herein.

To achieve these and other advantages and in accordance with the purpose of the present invention, as embodied and broadly described herein, the present invention provides in one aspect a digital device including a camera unit including a focus lens capable of capturing a target as multiple layers in a plurality of distances, an image data sensor unit sensing image data of the target captured by the camera unit, the image data sensor unit extracting depth data of the target from the image data, a memory unit storing a plurality of authentication body part vein image data differing from each other in depth from a skin surface and depth data corresponding thereto, a pre-processing unit determining information of the captured target from the image data sensed by the image data sensor unit, the pre-processing unit, if the determined image data is body part vein image data, creating processed body part vein image data for authentication, a comparing unit comparing the processed body part vein image data with at least one of a plurality of the authentication body part vein image data differing from each other in the depth from the skin surface stored in the memory unit, and a controller, if an execution mode to be executed is a security authentication mode, performing authentication by activating the camera unit, receiving a plurality of body part vein image data of the target captured as multiple layers in a plurality of distances by adjusting the focus lens, extracting depth data according to the received data, and comparing the processed body part vein image data created by the pre-processing unit with a plurality of the authentication body part vein image data differing from each other in the depth from the skin surface stored in the memory unit and the depth data corresponding thereto.

In another aspect, the present invention provides a digital device including a camera unit including a focus lens capable of capturing a target as multiple layers in a plurality of distances, an image data sensor unit sensing image data of the target captured by the camera unit, the image data sensor unit extracting depth data of the target from the image data, a memory unit storing a plurality of authentication face vein image data differing from each other in depth from a skin surface and depth data corresponding thereto, a pre-processing unit determining information of the captured target from the image data sensed by the image data sensor unit, the pre-processing unit, if the determined image data is face vein image data, creating processed face vein image data for authentication, a comparing unit comparing the processed face vein image data with at least one of a plurality of the authentication face vein image data differing from each other in the depth from the skin surface stored in the memory unit, and a controller, if an execution mode to be executed is a security authentication mode, performing authentication by activating the camera unit, receiving a plurality of face vein image data of the target captured as multiple layers in a plurality of distances by adjusting the focus lens, extracting depth data according to the received data, and comparing the processed face vein image data created by the pre-processing unit with a plurality of the authentication face vein image data differing from each other in the depth from the skin surface stored in the memory unit and the depth data corresponding thereto.

In another aspect, the present invention provides a method of authenticating a vein in a digital device including a memory and a camera unit including receiving a security authentication mode command, adjusting a focus lens by activating the camera unit, capturing a target to authenticate as multiple layers in a plurality of distances, sensing image data of the captured target, extracting depth data from the image data, determining whether the image data is body part vein image data, if the image data is the body part vein image data, creating processed body part vein image data from the body part vein image data, comparing the processed body part vein image data and corresponding depth data with at least one of a plurality of authentication body part vein image data differing from each other in the depth from the skin surface stored in the memory unit and corresponding depth data, and ending a security authentication mode according to a result of the comparing.

In further aspect, the present invention provides a method of authenticating a vein in a digital device including a memory and a camera unit, including receiving a security authentication mode command, adjusting a focus lens by activating the camera unit, capturing a target to authenticate as multiple layers in a plurality of distances, sensing image data of the captured target, extracting depth data from the image data, determining whether the image data is face vein image data, if the image data is the face vein image data, creating processed face vein image data from the face vein image data, comparing the processed face vein image data and corresponding depth data with at least one of a plurality of authentication face vein image data differing from each other in the depth from the skin surface stored in the memory unit and corresponding depth data, and ending a security authentication mode according to a result of the comparing.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Accordingly, the present invention provides the following advantages. According to one embodiment of the present invention, personal authentication can be performed quickly and conveniently by extracting a plurality of body part vein patterns body part differing from each other in depth from a skin surface by applying ToF (time of flight) employing a near infrared light source and then using the extracted patterns.

In addition, the safety and reliability of security authentication are improved by performing vein authentication based on a plurality of body part image data differing from each other in depth from a skin surface. Further, the present invention can reinforce security with higher accuracy by performing vein authentication once or several times based on a plurality of body part image data differing from each other in depth from a skin surface according to a security level.

Also, the present invention can perform personal authentication with high accuracy by obtaining 3D vein blood vessel information through depth information of a ToF sensor, compensate the inaccuracy of the related art face recognition through additional vein authentication, and apply use scenes of various types.

Effects obtainable from the present invention are not limited by the above mentioned effect. In addition, other unmentioned effects can be clearly understood from the following description by those having ordinary skill in the technical field to which the present invention pertains.

BRIEF DESCRIPTION OF THE DRAWINGS

Arrangements and embodiments are described in detail with reference to the following drawings in which like reference numerals refer to like elements and wherein.

DETAILED DESCRIPTION OF THE INVENTION

Description will now be given in detail according to exemplary embodiments disclosed herein, with reference to the accompanying drawings. In general, a suffix such as "module" and "unit" can be used to refer to elements or components. Use of such a suffix herein is merely intended to facilitate description of the specification, and the suffix itself is not intended to give any special meaning or function. In addition, such an ordinal number as 'first, 'second', 'third' and the like can have a meaning of an order. Yet, the terminologies can be used for the purpose of distinguishing one component from another component capable of being overlapped with each other.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
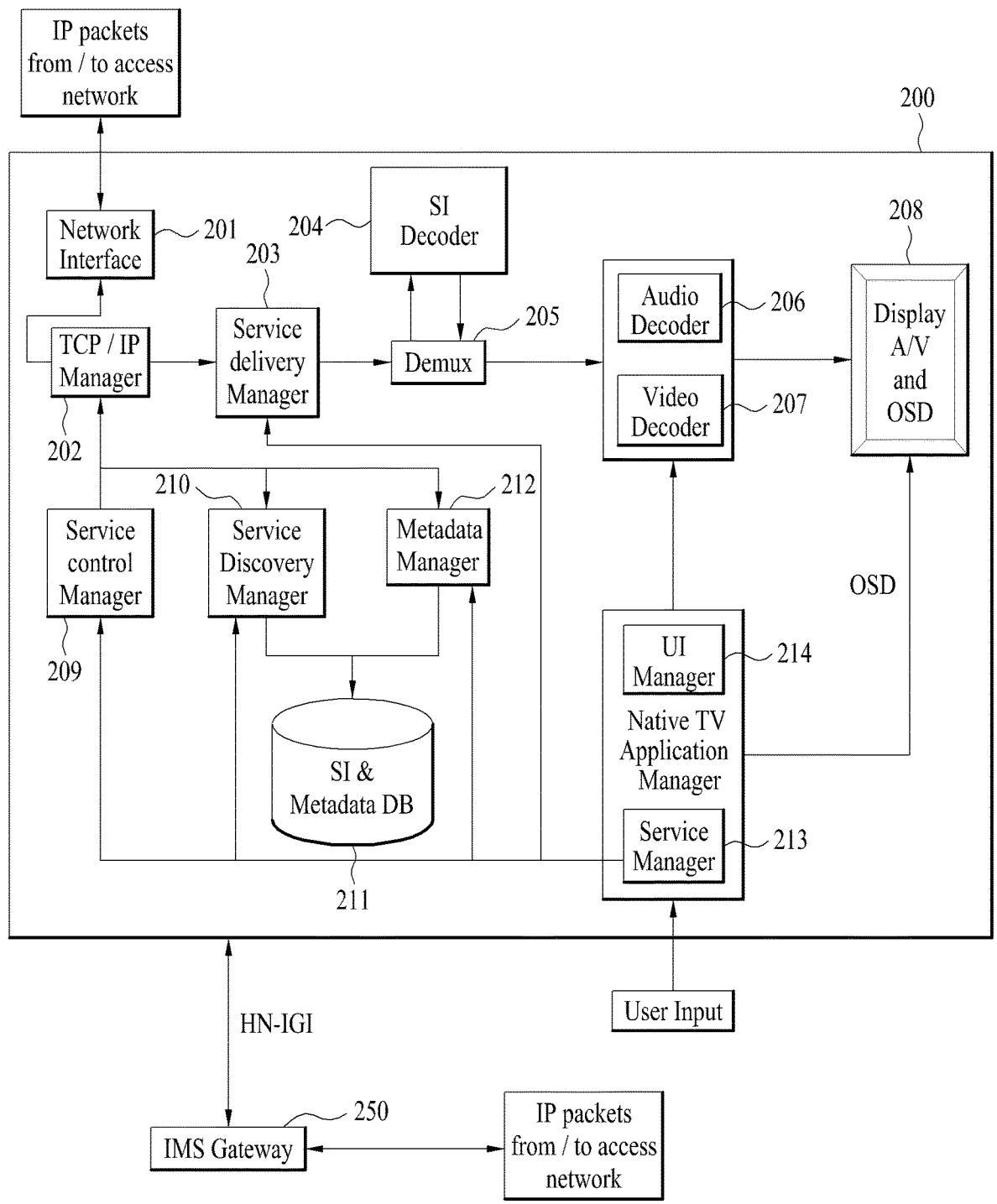
FIG. 1 is a block diagram of a digital device according to one embodiment of the present invention.
Figure 2:
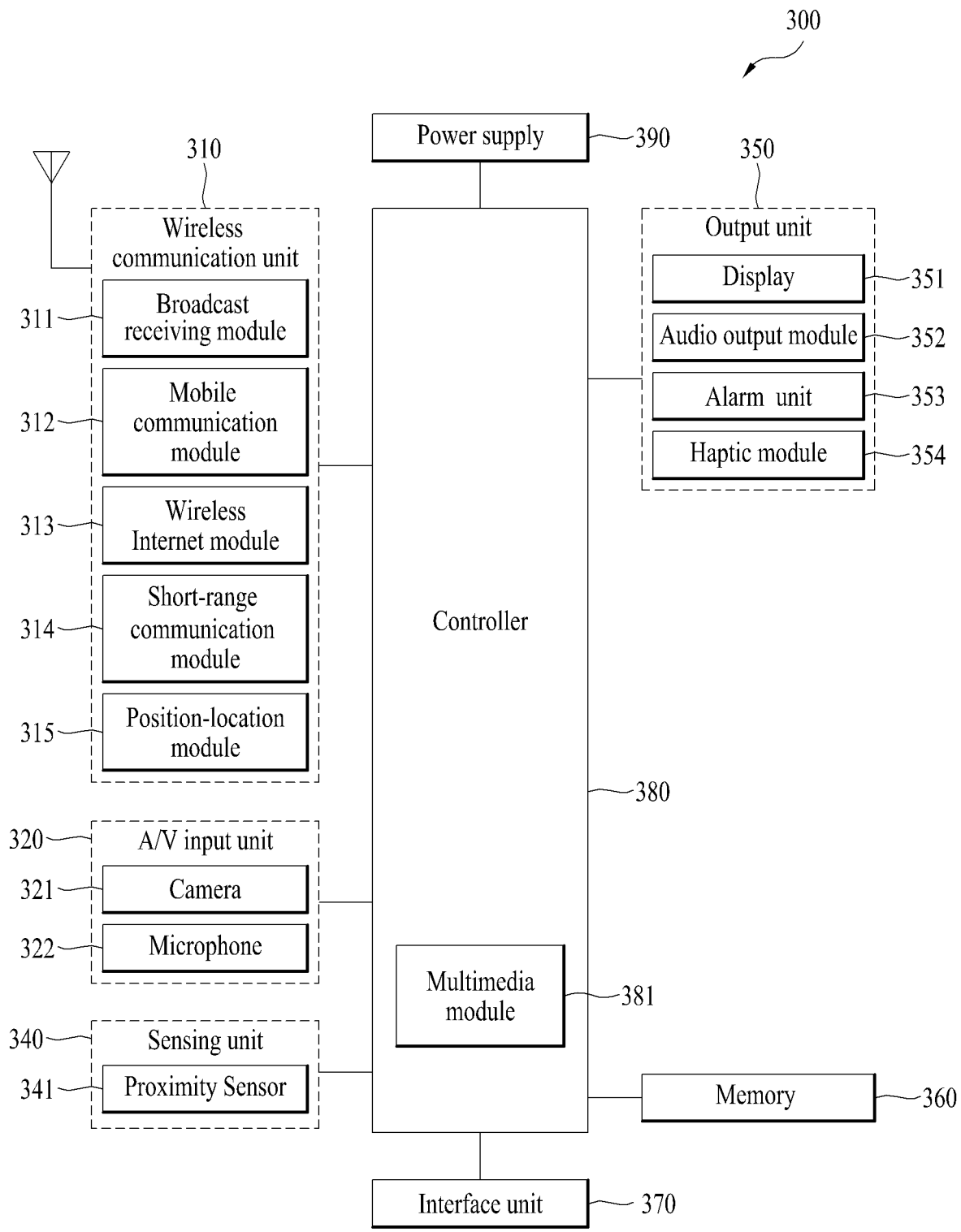
FIG. 2 is a block diagram of a digital device according to another embodiment of the present invention.

A digital device according to an embodiment of the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 1 and mobile device is used in FIG. 2 depicting the digital device. Further, the digital device in this specification can be referred to configuration having only a panel, set-top box (STB), or a set including the entire system.

Also, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/ LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device. Further, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control method (hereinafter referred as "input method") supporting handwriting input, touch-screen, and space remote control.

Furthermore, the digital device can use a standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles an external input, the external input includes external input devices described above, meaning all input methods or digital devices, capable of transmitting and receiving data through wired or wireless network connected to and from the digital device. For example, the external input includes High Definition Multimedia Interface (HDMI), game devices such as PlayStation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Video on Demand or streaming service, and service server providing pay services. In this application, when application is described for the convenience of explanation, the meaning of application in the context can include services as well as applications.

In the following description, various embodiments according to an embodiment of the present invention are explained with reference to attached drawings. In particular, FIG. 1 is a block diagram of a digital device according to one embodiment of the present invention.

The digital device 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 can receive or transmit IP packets including service data through a network. In other words, the network interface 201 can receive IP packets including at least one of text data, image data, audio data, and video data, used for SNS, as well as services and applications from a server connected thereto through a network.

The TCP/IP manager 202 involves delivery of IP packets transmitted to the digital device 200 and IP packets transmitted from the digital device 200, that is, packet delivery between a source and a destination. The TCP/IP manager 202 classifies received packets according to an appropriate protocol and outputs the classified packets to the service delivery manager 205, the service discovery manager 210, the service control manager 209, and the metadata manager 212.

The service delivery manager 203 can control classification and processing of service data. The service delivery manager 203 can also control real-time streaming data, for example, using real-time protocol/real-time control protocol (RTP/RTCP). In other words, the service delivery manager 203 can parse a real-time streaming data packet, transmitted based on the RTP, according to the RTP and transmits the parsed data packet to the demultiplexer 205 or store the parsed data packet in the SI & metadata DB 211 under the control of the service manager 213. The service delivery manager 203 can feed back network reception information to the server based on the RTP.

The demultiplexer 205 can demultiplex audio data, video data, SI from a received packet through packet identifier (PID) filtering and transmit the demultiplexed data to corresponding processors, that is, the audio/video decoder 206/207 and the SI decoder 204. The SI decoder 204 can parse and/or decode SI data such as program specific information (PSI), program and system information protocol (PSIP), digital video broadcast-service information (DVB-SI), etc.

The SI decoder 204 can store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail. The audio decoder 206 and the video decoder 207 respectively can decode audio data and video data, which are demultiplexed by the demultiplexer 205. The decoded audio data and video data can be provided to the user through the display unit 208.

The application manager may include a service manager 213 and a user interface (UI) manager 214, administrate the overall state of the digital device 200, provide a UI, and manage other mangers. The UI manager 214 can receive a key input from the user and provide a graphical user interface (GUI) related to a receiver operation corresponding to the key input through OSD.

The service manager 213 can control and manage service-related managers such as the service delivery manager 203, the service discovery manager 210, the service control manager 209, and the metadata manager 212. The service manager 213 can configure a channel map and enable channel control at the request of the user based on the channel map. Further, the service manager 213 can receive service information corresponding to channel from the SI decoder 204 and set audio/video PID of a selected channel to the demultiplexer 205 so as to control the demultiplexing procedure of the demultiplexer 205.

The service discovery manager 210 can provide information required to select a service provider that provides a service. Upon receipt of a signal for selecting a channel from the service manager 213, the service discovery manager 210 discovers a service based on the received signal.

The service control manager 209 can select and control a service. For example, the service control manager 209 can perform service selection and control using IGMP (Internet Group Management Protocol) or real time streaming protocol (RTSP) when the user selects a live broadcast service and using RTSP when the user selects a video on demand (VOD) service.

The metadata manager 212 can manage metadata regarding services and store metadata in the SI & metadata DB 211. The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like. An IMS (IP Multimedia Subsystem) gateway 250 may include functions required to access an IMS based IPTV services.

Next, FIG. 2 is a block diagram of a digital device according to another embodiment of the present invention. In particular, FIG. 2 shows the mobile terminal 300 having various components, but implementing all of the illustrated components is not a requirement. More or fewer components may be implemented according to various embodiments.

With reference to FIG. 2, the mobile terminal 300 includes a wireless communication unit 310, an A/V (audio/video) input unit 320, a user input unit 330, a sensing unit 340, an output unit 350, a memory 360, an interface unit 370, a controller 380, and a power supply unit 390. The detailed description of each component is as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 can be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems. The broadcast signal and/or broadcast associated information received by the broadcast receiving module 311 can be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 can detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 can sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, and a haptic module 354. A projector module may also be included. The display 351 is typically implemented to visually display (output) information associated with the mobile terminal 300.

For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this instance, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

A proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. In addition, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence. The haptic module 354 can generate various tactile effects as well as the vibration. For instance, the haptic module 354 can generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 can perform a pattern (or image) recognizing process for recognizing a writing input and a picture drawing input performed on the touch screen as characters or images, respectively.

The power supply unit 390 provides power required by various components of the mobile terminal 300. The power may be internal power, external power, or combinations of internal and external power. Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 3:
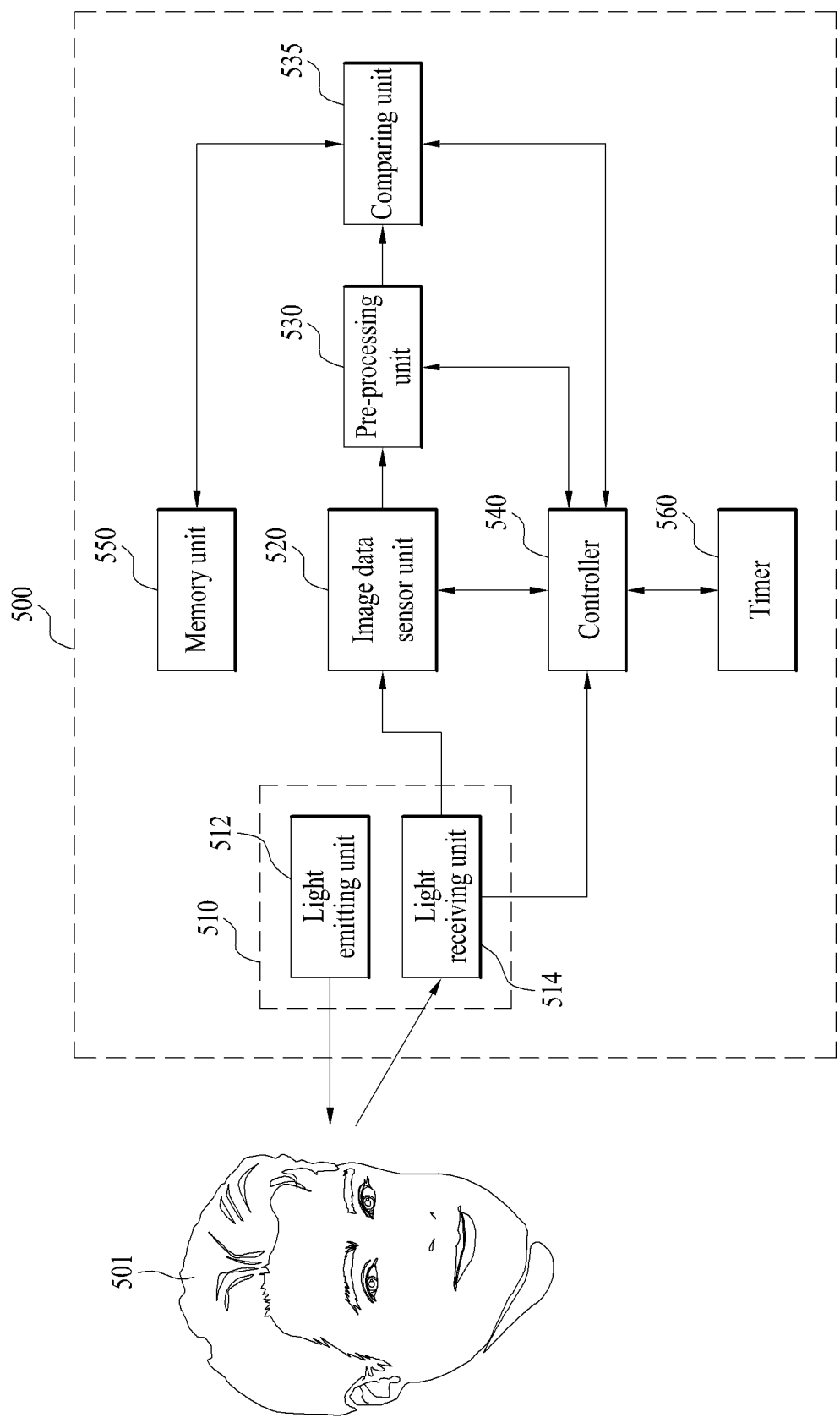
FIG. 3 is a block diagram of an image processor of a digital device according to an embodiment of the present invention.

FIG. 3 is a block diagram of a biometric authentication processor of a digital device according to an embodiment of the present invention. Referring to FIG. 3, a biometric authentication processor of a digital device 500 may include a camera unit 510, an image data sensor unit 520, a memory unit 550, a pre-processing unit 530, a comparing unit 535 and a controller 540.

The biometric authentication processor of the digital device may further include a timer 560 and an optical guide unit. Further, the camera unit 510 may employ a ToF sensor that uses near infrared rays (NIR). The ToF sensor measures a distance from a target and represents a strength of a difference of a phase signal reflecting from the target as an image form, thereby checking a vein vessel pattern of a body part.

The camera unit 510 may include a light emitting unit 512 projecting light onto a target 501 and a light receiving unit detecting light reflecting from the target 501. In one example, the light emitting unit 512 may include a light source projecting light corresponding to an infrared region of a light spectrum. In another example, the light emitting unit 512 can project color light corresponding to a visible region of the light spectrum and infrared light corresponding to an infrared region of the light spectrum.

Further, the light source projecting the color light may include a red light source projecting red light of a red wavelength range, a green light source projecting green light of a green wavelength range, and a blue light source projecting blue light of a blue wavelength range. Each of the red, green and blue light sources can use a light-emitting diode (LED) or a laser diode (LD).

In addition, the light receiving unit 514 may include a focus lens that can move linearly between a target and an image data sensor unit in response to an autofocus control signal of a controller. Further, the focus lens can vary depth data corresponding to body part vein image data according to a moving distance.

The moving distance of the focus lens may belong to a range of a distance between a center point of the focus lens and a body part vein. In some instances, the light receiving unit 514 can use a wideband coating lens capable of transmitting a color light of a visible wavelength range and a light of an infrared wavelength range among the lights reflecting from the target 501. In another instance, the light receiving unit 514 can use a lens having wideband focusing performance capable of focusing the color light and the infrared light.

The light receiving unit 514 may further include a filter capable of transmitting light of an IR wavelength range from the light transmitted by the focus lens. For example, the filter may include a single band pass filter transmitting the infrared light of the infrared (IR) wavelength range transmitted by the focus lens. In some instances, the filter may include a dual band pass filter simultaneously transmitting color light of red, green and blue wavelength ranges and infrared (IR) light of an infrared wavelength range, which have been transmitted by the focus lens.

Hence, the filter can cut off the light of the UV wavelength range, the light of the wavelength range between the red, green and blue wavelength range and the IR wavelength range, and the light of the wavelength range over the IR wavelength range. In addition, the image data sensor unit 520 can sense image data of the target 501 captured by the camera unit 510 and extract depth data of the target from the image data.

Also, the memory unit 550 can store a plurality of authentication body part vein image data differing from each other in depth from a skin surface and depth data corresponding to them. The pre-processing unit 530 determines information of a captured target from the image data sensed by the image data sensor unit 520. If the determined image data is body part vein image data, the pre-processing unit 530 can create processed body part vein image data for authentication.

Further, the information of the captured target may include shapes (e.g., size, contour, etc.) of the body part vein and the like. For example, the pre-processing unit 530 may include a detecting unit detecting an amount of light sensed from the image data sensor unit 520, a converting unit converting the detected amount of the light into an electric signal, and an extracting unit extracting information on an image from the electric signal, thereby determining whether the captured target is a body part vein. According to a result of the determination, the pre-processing unit 530 can create processed image data of the body part vein.

The comparing unit 535 can compare the processed body part vein image data with at least one of a plurality of authentication body part vein image data differing from each other in depth from a skin surface, which are stored in the memory unit 550. Subsequently, if an execution mode to be executed is a security authentication mode, the controller 540 can activate the camera unit 550, receive a plurality of body part vein image data of the target 501 captured as multiple layers in a plurality of distances by adjusting the focus lens, extract depth data according to the received data, and perform authentication by comparing the processed body part vein image data created by the pre-processing unit 530 with a plurality of authentication body part vein image data differing from each other in depth from a skin surface, which are stored in the memory unit 550, and the depth data corresponding to them.

Further, the processed body part vein image data may include at least one of face vein image data, wrist vein image data, hand dorsum vein image data, finger vein image data, palm vein image data, and foot vein image data. When capturing body part vein image data of a target by activating the camera unit 510, the controller 540 can perform autofocus by controlling a movement of the focus lens.

After performing the autofocus by controlling the movement of the focus lens, the controller 540 can perform digital zoom for enlarging a portion of body part vein image data of the target sensed by the image data sensor unit. The reason for performing the digital zoom is described as follows. First of all, if a distance between the camera unit 510 and the target 501 is greater or smaller than an optimal distance, visibility of the processed body part vein image data processed by the pre-processing unit 530 is lowered so as to blur the image data. When the image data is blurred, it is difficult to perform security authentication. Therefore, the visibility of the image data can be raised by performing the digital zoom.

Hence, after calculating the visibility of the processed body part vein image data processed by the pre-processing unit 530, if the calculated visibility is equal to or smaller than a preset reference value, the controller 540 can perform the digital zoom of enlarging a portion of the body part vein image data.

Thus, according to an embodiment of the present invention, since the digital zoom is automatically performed depending on the visibility of the image data, a user can perform security authentication by capturing the target 501 to authenticate freely irrespective of a distance between the target 501 and the camera. After performing the autofocus by controlling the movement of the focus lens, the controller 540 can perform auto zoom for enlarging a portion of body part vein image data of the target sensed by the image data sensor unit and then enlarge the portion of the body part vein image data by digital zoom.

The reason for enlarging the portion of the body part vein image data by digital zoom after performing the auto zoom is described as follows. First of all, although auto zoom is performed, image data may be blurred due to the limitation of the zoom through a lens. When the image data is blurred, it is difficult to perform security authentication. Therefore, the visibility of the image data can be raised by performing the digital zoom.

Hence, after calculating the visibility of the processed body part vein image data processed by the pre-processing unit 530, if the calculated visibility is equal to or smaller than a preset reference value, the controller 540 can perform auto zoom of enlarging a portion of the body part vein image data and then enlarge the portion of the body part vein image data by digital zoom.

Thus, according to an embodiment of the present invention, since the digital zoom is automatically performed after performing the auto zoom depending on the visibility of the image data, a user can perform security authentication by capturing the target 501 to authenticate freely irrespective of a distance between the target 501 and the camera.

After performing the autofocus by controlling the movement of the focus lens, the controller 540 can sense a portion of body part vein image data of the target 501 by scanning a partial region of the image data sensor unit 520 and then perform auto zoom for enlarging the sensed portion of the body part vein image data. Further, the controller 540 may further include a mirror scanner scanning the partial region of the image data sensor unit 520.

The reason for including the mirror scanner is described as follows. Namely, although a portion of body part vein image data sensed through the mirror scanner is enlarged, resolution is not decreased. The reason for performing the auto zoom is described as follows. First of all, if a distance between the camera unit 510 and the target 501 is greater or smaller than an optimal distance, visibility of the processed body part vein image data processed by the pre-processing unit 530 is lowered so as to blur the image data. When the image data is blurred, it is difficult to perform security authentication. Therefore, the visibility of the image data can be raised by performing the auto zoom.

Hence, after calculating the visibility of the processed body part vein image data processed by the pre-processing unit 530, if the calculated visibility is equal to or smaller than a preset reference value, the controller 540 can sense a portion of the body part vein image data of the target 501 by scanning a partial region of the image data sensor unit 520 and perform the auto zoom of enlarging the sensed portion of the body part vein image data.

Thus, according to an embodiment of the present invention, since the auto zoom is automatically performed depending on the visibility of the image data, a user can perform security authentication by capturing the target 501 to authenticate freely irrespective of a distance between the target 501 and the camera. Moreover, according to a security level of an execution mode to be executed, the controller 540 can perform authentication of comparing processed body part vein image data with one or more of a plurality of authentication body part vein image data differing from each other in depth from a skin surface, which are stored in the memory unit 550.

In one example, if a security level of an execution mode to be executed is a low level, the controller 540 can perform a primary authentication of comparing processed body part vein image data with authentication body part vein image data having a first depth data stored in the memory unit 550. In another example, if a security level of an execution mode to be executed is a middle level, the controller 540 can perform both a primary authentication of comparing processed body part vein image data with authentication body part vein image data having a first depth data stored in the memory unit 550 and a secondary authentication of comparing processed body part vein image data with authentication body part vein image data having a second depth data stored in the memory unit 550. Further, the second depth data may include data of which a depth from a skin surface is greater than that of the first depth data.

In a further example, if a security level of an execution mode to be executed is a high level, the controller 540 can perform a primary authentication of comparing processed body part vein image data with authentication body part vein image data having a first depth data stored in the memory unit 550, a secondary authentication of comparing processed body part vein image data with authentication body part vein image data having a second depth data stored in the memory unit 550, and a tertiary authentication of comparing processed body part vein image data with authentication body part vein image data having a third depth data stored in the memory unit 550 all.

Further, the second depth data may include data of which a depth from a skin surface is greater than that of the first depth data, and the third depth data may include data of which a depth from a skin surface is greater than that of the second depth data. In addition, the controller 540 can check a security level of an execution mode to be executed and then provide information on the checked security level to a display screen.

Also, when body part vein authentication is performed, if the authentication is successful, the controller 540 can provide an authentication success notification message to the display screen and also provide a next step guide message to the display screen. In addition, when body part vein authentication is performed, if the authentication fails, the controller 540 can provide an authentication failure notification message to the display screen and also provide a re-authentication message to the display screen.

When performing the body part vein authentication, the controller 540 measures a projection time of IR light projected from the camera unit 510 using the timer 560. If the projection time of the IR light exceeds a reference time, the controller 540 can control the light emitting unit 512 of the camera unit 510 to cut off the output of the IR light. The output of the IR light is cutoff to solve the eye-safety problem. Namely, the danger due to the long-term exposure to the IR light can be reduced and safe authentication can be secured.

In other instances, when performing the body part vein authentication, the controller 540 measures a projection time of IR light projected from the camera unit 510 using the timer 560. If the projection time of the IR light exceeds a reference time, the controller 540 can control the light emitting unit 512 of the camera unit 510 to lower the strength of an output of the IR light to be smaller than a setup value.

The present invention may also include an optical guide unit configured to calculate current location information of the target 501 to be authenticated and guide location correction for the current location information of the target. Further, the optical guide unit may include a light source unit projecting light onto a target to be authenticated, a sensing unit sensing light reflecting from the target, and a location calculating unit calculating current location information of the target based on the detected light.

Particularly, the location calculating unit can extract coordinates of light spot points of the light detected from the sensing unit, calculate a distance value between the light spot points, and store current location information of a target, which includes the calculated distance value. In addition, the optical guide unit may include a speaker unit outputting audio data for guiding location correction for the current location information of the target and a display unit displaying a body image of the target including the current location information.

Further, the light source unit may include at least three light sources. For example, the light sources of the light source unit may be disposed by being spaced apart from each other in predetermined intervals along a periphery of the sensing unit. Further, the light sources of the light source unit can be disposed to have an angle range between 5 and 90 degrees from a surface of the optical guide unit.

Thus, the present invention can perform personal authentication quickly and conveniently by extracting a plurality of body part vein patterns body part differing from each other in depth from a skin surface by applying ToF (time of flight) employing a near infrared light source and then using the extracted patterns. The present invention can also improve safety and reliability of security authentication by performing vein authentication based on a plurality of body part image data differing from each other in depth from a skin surface.

Further, the present invention can reinforce security with higher accuracy by performing vein authentication once or several times based on a plurality of body part image data differing from each other in depth from a skin surface according to a security level. Furthermore, the present invention can perform personal authentication with high accuracy by obtaining 3D vein blood vessel information through depth information of a ToF sensor, compensate the inaccuracy of the related art face recognition through additional vein authentication, and apply use scenes of various types.

Figure 4:
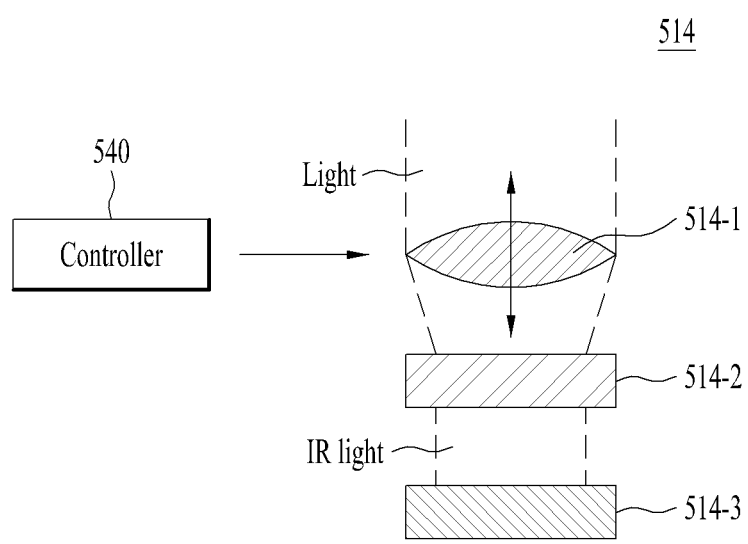
FIG. 4 is a block diagram of a light receiving unit of FIG. 3.

Next, FIG. 4 is a block diagram of the light receiving unit of FIG. 3. Referring to FIG. 4, the light receiving unit 514 may include a focus lens 514-1. The focus lens 514-1 can move linearly between a target and the image data sensor unit in response to an autofocus signal of the controller. Further, the focus lens 514-1 can vary depth data corresponding to body part vein image data according to a moving distance. The moving distance of the focus lens 514-1 includes a distance between a center point of the focus lens and a body part vein of a target.

In some instances, the light receiving unit 514 can use a wideband coating lens capable of transmitting color light of a visible wavelength range and light of an infrared wavelength range among the lights reflecting from the target. In another instances the light receiving unit 514 can use a lens having wideband focusing performance capable of focusing the color light and the infrared light.

The light receiving unit 514 may further include a filter 514-2 transmitting light of IR wavelength range from the light transmitted by the focus lens. For example, the filter 514-2 may include a single band pass filter transmitting the infrared light of the infrared (IR) wavelength range transmitted by the focus lens. In some instances, the filter 514-2 may include a dual band pass filter simultaneously transmitting color light of red, green and blue wavelength ranges and infrared (IR) light of an infrared wavelength range, which have been transmitted by the focus lens.

Hence, the filter 514-2 can cut off the light of the UV wavelength range, the light of the wavelength range between the red, green and blue wavelength range and the IR wavelength range, and the light of the wavelength range over the IR wavelength range. In addition, the light receiving unit 514 may further include an image sensor 514-3 capable of sensing IR light only, sensing color light and IR light simultaneously, or sensing color light and IR light in different time slots respectively. In some instances, the image sensor 514-3 may be removed from the light receiving unit 514 but included in the image data sensor unit of the present invention.

Figure 5:
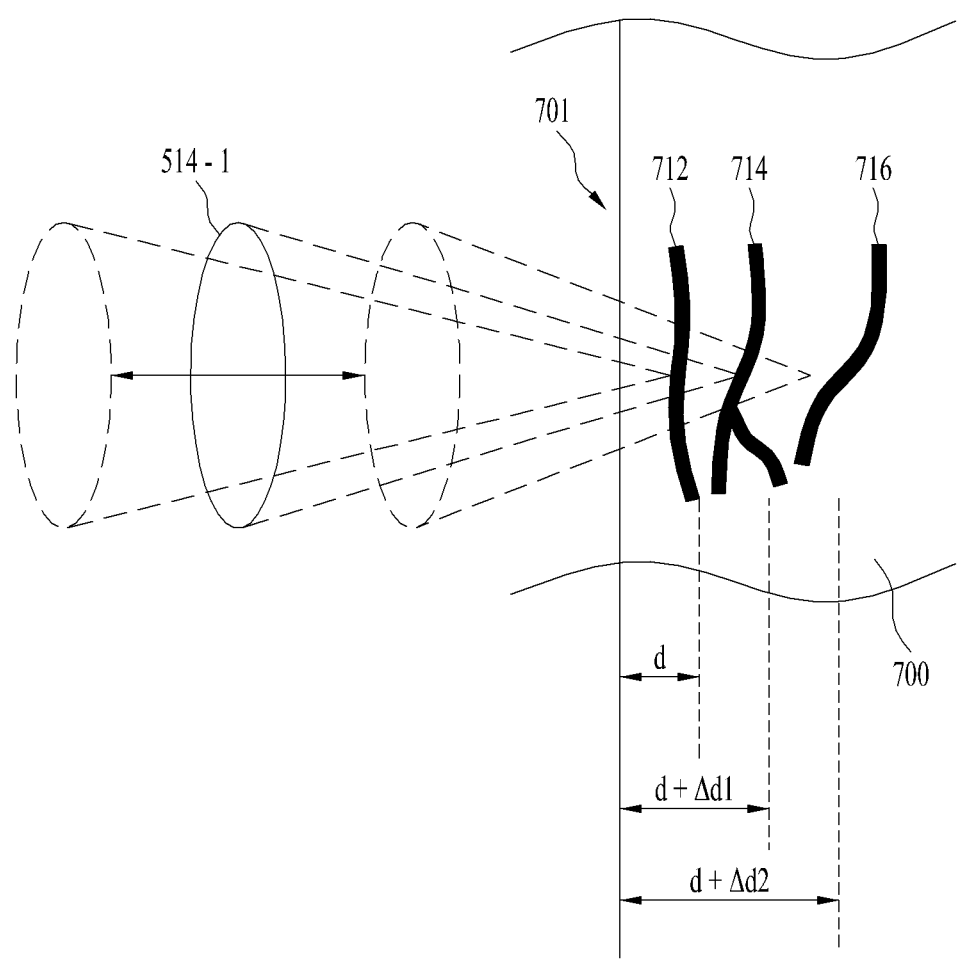
FIG. 5 is a diagram illustrating a variability of depth data depending on a focus lens movement.

FIG. 5 is a diagram illustrating variability of depth data depending on a focus lens movement. Referring to FIG. 5, the focus lens 514-1 of the present invention can move linearly between a target and the image data sensor unit in response to an autofocus signal of the controller. Further, the focus lens 514-1 can vary depth data corresponding to body part vein image data according to a moving distance.

The moving distance of the focus lens 514-1 may be within a range of a distance between a center point of the focus lens 154-1 and a body part vein of a target. For example, when a first vein 712, a second vein 714 and a third vein 716 are located at a first depth d, a second depth d+$\Delta$d1 and a third depth d+$\Delta$d2 from a skin surface 701 of a body part, respectively, if the focus lens 514-1 gets closer to the skin surface 701 of the body part, the focus lens 514-1 becomes more focused on the third vein 716 located at the third depth d+Δd2 from the skin surface 701 of the body part. Or, if the focus lens 514-1 gets farther from the skin surface 701 of the body part, the focus lens 514-1 becomes more focused on the first vein 712 located at the first depth d from the skin surface 701 of the body part.

Therefore, regarding body part vein image data sensed when the focus lens 514-1 is focused on the third vein 716 located at the third depth d+Δd2 from the skin surface 701 of the body part, visibility of the third vein 716 may appear higher than that of each of the first vein 712 and the second vein 714. In addition, regarding body part vein image data sensed when the focus lens 514-1 is focused on the first vein 712 located at the first depth d from the skin surface 701 of the body part, visibility of the first vein 712 may appear higher than that of each of the second vein 714 and the third vein 716.

Thus, the present invention can improve safety and reliability of security authentication by performing vein authentication based on a plurality of body part image data differing from each other in depth from a skin surface.

Figure 6:
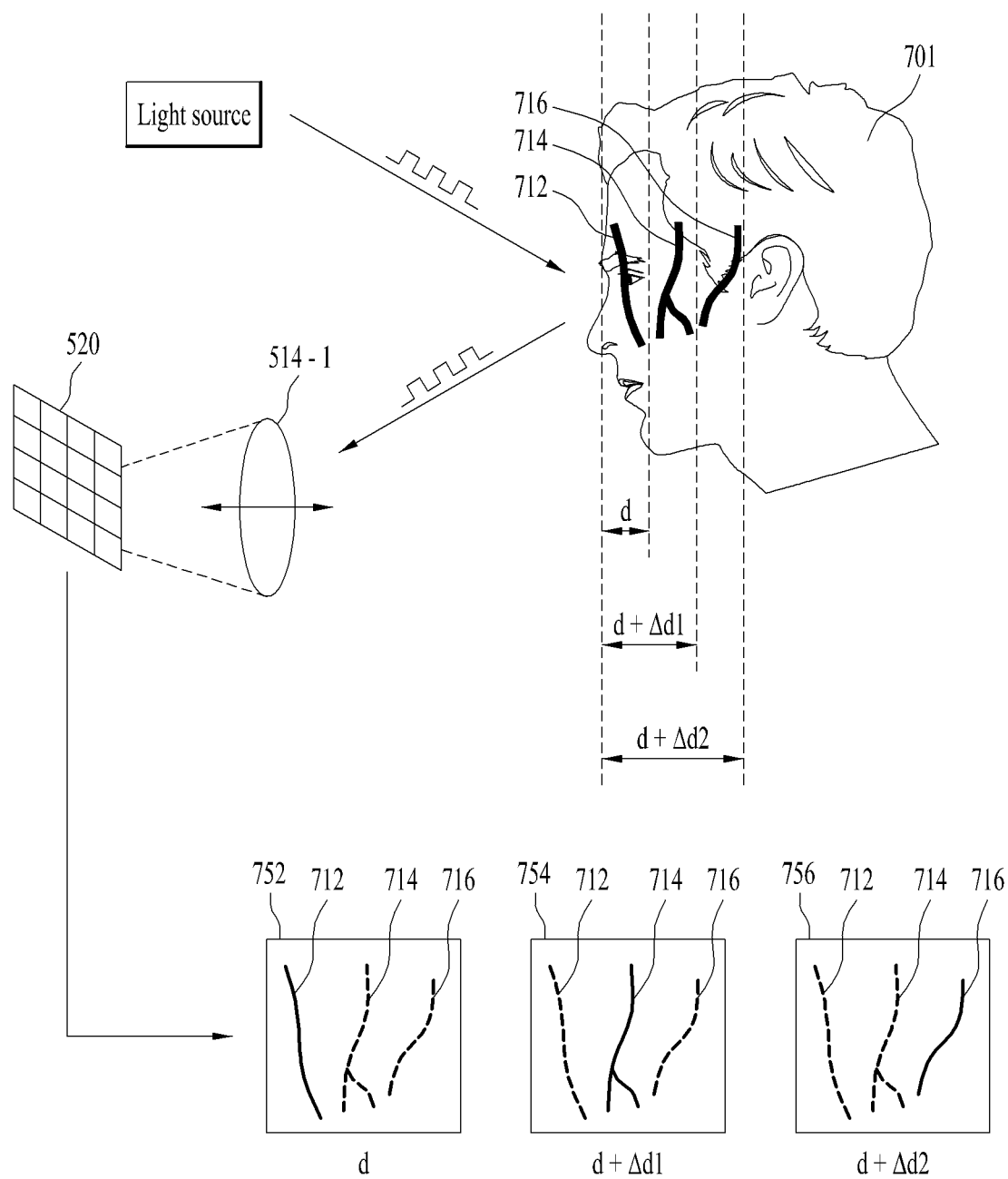
FIG. 6 is a diagram illustrating image data sensed according to a focus lens movement.

Next, FIG. 6 is a diagram illustrating image data sensed according to a focus lens movement. Referring to FIG. 6, if receiving a security authentication mode command, the present invention can project IR light to a target 701 from a light source of a light emitting unit in order to capture the target 701 to authenticate. Subsequently, according to an embodiment of the present invention, the IR reflecting from the target 701 can be sensed by the image data sensor unit 520 through the focus lens 514-1.

In this instance, regarding the target 701 to be authenticated, when a first vein 712, a second vein 714 and a third vein 716 are located at a first depth d, a second depth d+Δd1 and a third depth d+Δd2 from a skin surface, respectively, the focus lens 514-1 can be focused on the first vein 712 located at the first depth d from the skin surface, the second vein 714 located at the second depth d+Δd1 from the skin surface, or the third vein 716 located at the third depth d+Δd2 from the skin surface according to a movement of the focus lens 514-1.

Namely, if the focus lens 514-1 moves to get closer to the skin surface of the target 701 part, the focus lens 514-1 can become more focused on the third vein 716 located at the third depth d+Δd2 corresponding to a deep depth from the skin surface. Or, if the focus lens 514-1 moves to get farther from the skin surface of the target 701, the focus lens 514-1 can become more focused on the first vein 712 located at the first depth d corresponding to a shallow depth from the skin surface of the target 701.

Therefore, regarding body part vein image data 756 sensed when the focus lens 514-1 is focused on the third vein 716 located at the third depth d+Δd2 from the skin surface of the target, visibility of the third vein 716 may appear higher than that of each of the first vein 712 and the second vein 714.

Regarding body part vein image data 754 sensed when the focus lens 514-1 is focused on the second vein 714 located at the second depth d+Δd1 from the skin surface of the target, visibility of the second vein 714 may appear higher than that of each of the first vein 712 and the third vein 716. Moreover, regarding body part vein image data 752 sensed when the focus lens 514-1 is focused on the first vein 712 located at the first depth d from the skin surface of the target, visibility of the first vein 712 may appear higher than that of each of the second vein 714 and the third vein 716.

Figure 7:
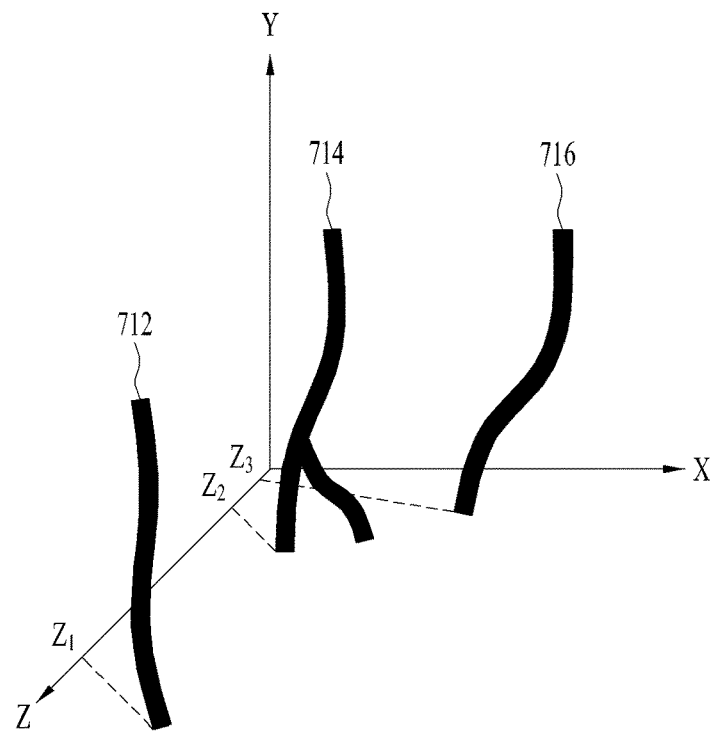
FIG. 7 is a diagram showing coordinates of a vein of a body part located according to a skin depth.
Figure 8:
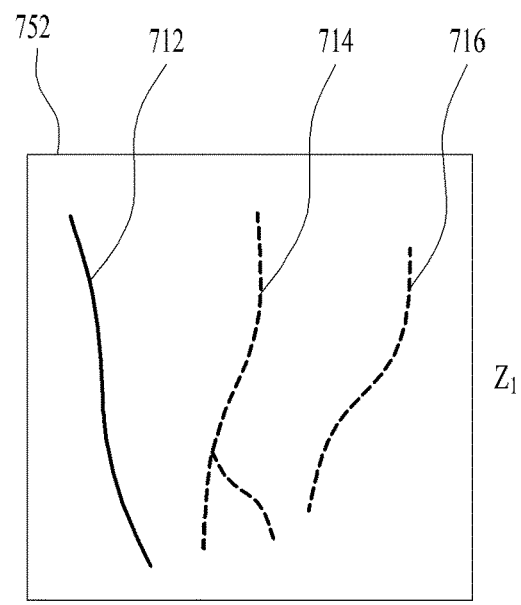
FIGS. 8 to 10 are diagrams showing body part vein image data sensed according to a skin depth.
Figure 9:
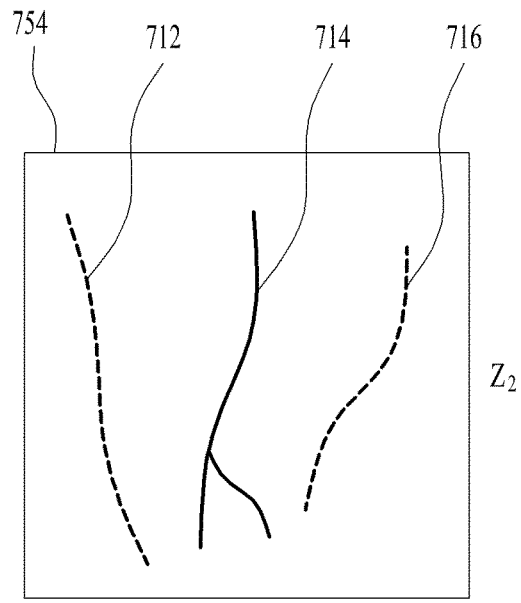
Figure 10:
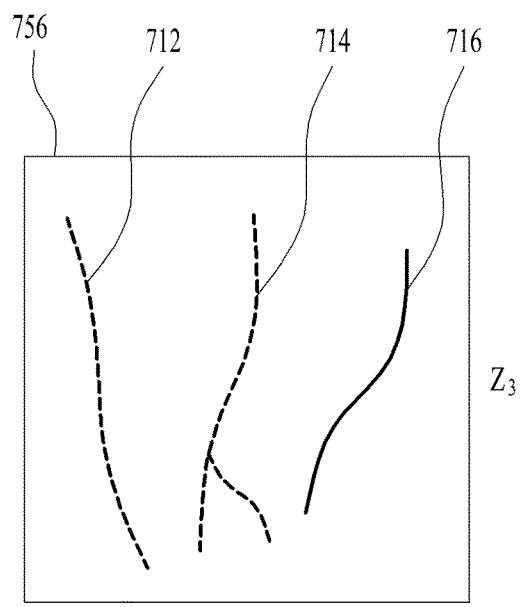

FIG. 7 is a diagram showing coordinates of a vein of a body part located according to a skin depth, and FIGS. 8 to 10 are diagrams showing body part vein image data sensed according to a skin depth. Referring to FIG. 7, if a target 701 to be authenticated includes a first vein 712, a second vein 714 and a third vein 716, the first vein 712, the second vein 714 and the third vein 716 may be located at a first depth Z1, a second depth Z2 deeper than the first depth Z1, and a third depth Z3 deeper than each of the first depth Z1 and the second depth Z2 on coordinates, respectively.

Here, referring to FIG. 8, in response to a movement of a focus lens, if the focus lens is focused on the first vein 712 located at the first depth from a skin surface, visibility of the first vein 712 may appear higher than that of each of the second vein 714 and the third vein 716 regarding body part vein image data. And, referring to FIG. 9, in response to a movement of a focus lens, if the focus lens is focused on the second vein 714 located at the second depth from a skin surface, visibility of the second vein 714 may appear higher than that of each of the first vein 712 and the third vein 716 regarding body part vein image data.

Moreover, referring to FIG. 10, in response to a movement of a focus lens, if the focus lens is focused on the third vein 716 located at the third depth from a skin surface, visibility of the third vein 716 may appear higher than that of each of the first vein 712 and the second vein 714 regarding body part vein image data. Therefore, the present invention can perform the single or multiple authentication by saving a plurality of authentication body part vein image data differing from each other in depth from a skin surface to a memory unit for security authentication and comparing processed body part vein image data with one or more of a plurality of the authentication body part vein image data differing from each other in depth from the skin surface, which are saved to the memory unit.

In one example, if a security level of an execution mode to be executed is a low level, the controller 540 can perform a primary authentication of comparing processed body part vein image data with authentication body part vein image data having a first depth data stored in the memory unit. In another example, if a security level of an execution mode to be executed is a middle level, the present invention can perform both a primary authentication of comparing processed body part vein image data with authentication body part vein image data having a first depth data stored in the memory unit and a secondary authentication of comparing processed body part vein image data with authentication body part vein image data having a second depth data stored in the memory unit. Further, the second depth data may include data of which depth from a skin surface is greater than that of the first depth data.

In a further example, if a security level of an execution mode to be executed is a high level, the present invention can perform a primary authentication of comparing processed body part vein image data with authentication body part vein image data having a first depth data stored in the memory unit, a secondary authentication of comparing processed body part vein image data with authentication body part vein image data having a second depth data stored in the memory unit, and a tertiary authentication of comparing processed body part vein image data with authentication body part vein image data having a third depth data stored in the memory unit all. Further, the second depth data may include data of which depth from a skin surface is greater than that of the first depth data, and the third depth data may include data of which depth from a skin surface is greater than that of the second depth data.

Thus, the present invention can improve safety and reliability of security authentication by performing vein authentication based on a plurality of body part vein image data differing from each other in depth from a skin surface. Moreover, the present invention can reinforce security with higher accuracy by performing vein authentication once or several times based on a plurality of body part vein image data differing from each other in depth from a skin surface according to a security level.

Figure 11:
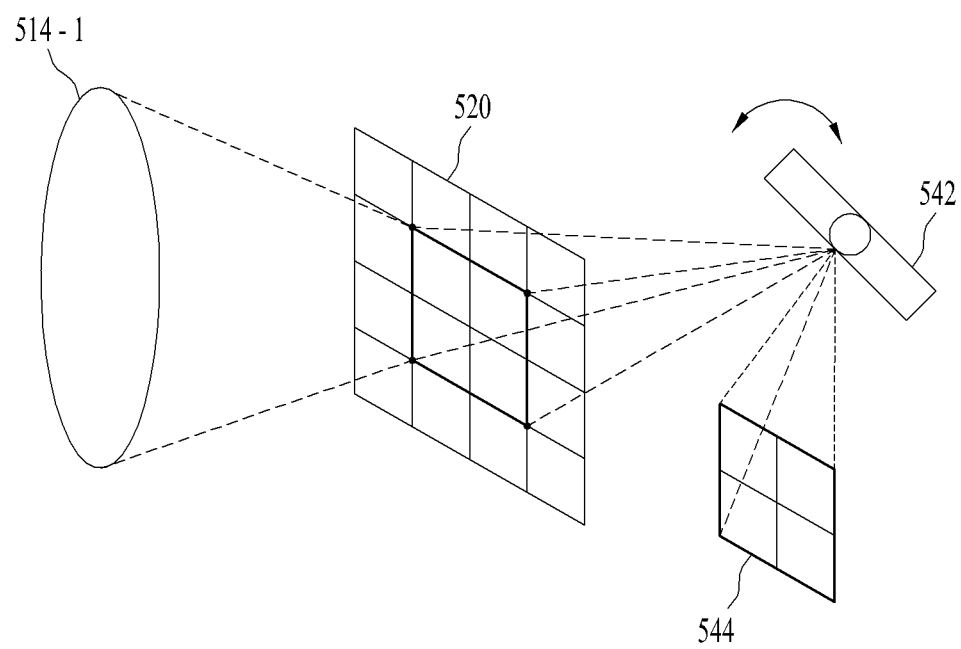
FIG. 11 is a diagram illustrating a process for performing auto zoom.

Next, FIG. 11 is a diagram illustrating a process for performing auto zoom. When body part vein image data of a target is captured by activating a camera unit, the present invention can perform autofocus by controlling a movement of a focus lens 514-1.

After performing the autofocus by controlling the movement of the focus lens 514-1, the present invention can perform digital zoom of enlarging a portion of the body part vein image data of the target sensed by an image data sensor unit. The reason for performing the digital zoom is described as follows. First of all, if a distance between the camera unit 510 and the target 501 is greater or smaller than an optimal distance, visibility of the processed body part vein image data processed by a pre-processing unit is lowered so as to blur the image data. When the image data is blurred, it is difficult to perform security authentication. Therefore, the visibility of the image data can be raised by performing the digital zoom.

Hence, after calculating the visibility of the processed body part vein image data processed by the pre-processing unit, if the calculated visibility is equal to or smaller than a preset reference value, the present invention can perform the digital zoom of enlarging a portion of the body part vein image data. Thus, according to an embodiment of the present invention, since the digital zoom is automatically performed depending on the visibility of the image data, a user can perform security authentication by capturing the target 501 to authenticate freely irrespective of a distance between the target and the camera.

After performing the autofocus by controlling the movement of the focus lens, the present invention can perform auto zoom for enlarging a portion of body part vein image data of the target sensed by the image data sensor unit and then enlarge the portion of the body part vein image data by digital zoom. The reason for enlarging the portion of the body part vein image data by digital zoom after performing the auto zoom is described as follows. First of all, although auto zoom is performed, image data may be blurred due to the limitation of the zoom through a lens. When the image data is blurred, it is difficult to perform security authentication. Therefore, the visibility of the image data can be raised by performing the digital zoom.

Hence, after calculating the visibility of the processed body part vein image data processed by the pre-processing unit, if the calculated visibility is equal to or smaller than a preset reference value, the present invention can perform auto zoom of enlarging a portion of the body part vein image data and then enlarge the portion of the body part vein image data by digital zoom. Thus, according to an embodiment of the present invention, since the digital zoom is automatically performed after performing the auto zoom depending on the visibility of the image data, a user can perform security authentication by capturing the target 501 to authenticate freely irrespective of a distance between the target and the camera.

Moreover, as shown in FIG. 11, after performing the autofocus by controlling the movement of the focus lens 514-1, the present invention can sense a portion of body part vein image data of the target by scanning a partial region of the image data sensor unit 520 and then perform auto zoom for enlarging the sensed portion 544 of the body part vein image data. Further, the present invention may further include a mirror scanner scanning the partial region 544 of the image data sensor unit 520. The reason for including the mirror scanner is described as follows. Namely, although a portion of body part vein image data sensed through the mirror scanner is enlarged, resolution is not decreased.

The reason for performing the auto zoom is described as follows. First of all, if a distance between the camera unit and the target is greater or smaller than an optimal distance, visibility of the processed body part vein image data processed by the pre-processing unit is lowered so as to blur the image data. When the image data is blurred, it is difficult to perform security authentication. Therefore, the visibility of the image data can be raised by performing the auto zoom.

Hence, after calculating the visibility of the processed body part vein image data processed by the pre-processing unit, if the calculated visibility is equal to or smaller than a preset reference value, the present invention can sense a portion 544 of the body part vein image data of the target by scanning a partial region of the image data sensor unit 520 and perform the auto zoom of enlarging the sensed portion 544 of the body part vein image data.

Thus, according to an embodiment of the present invention, since the auto zoom is automatically performed depending on the visibility of the image data, a user can perform security authentication by capturing the target to authenticate freely irrespective of a distance between the target and the camera.

Figure 12:
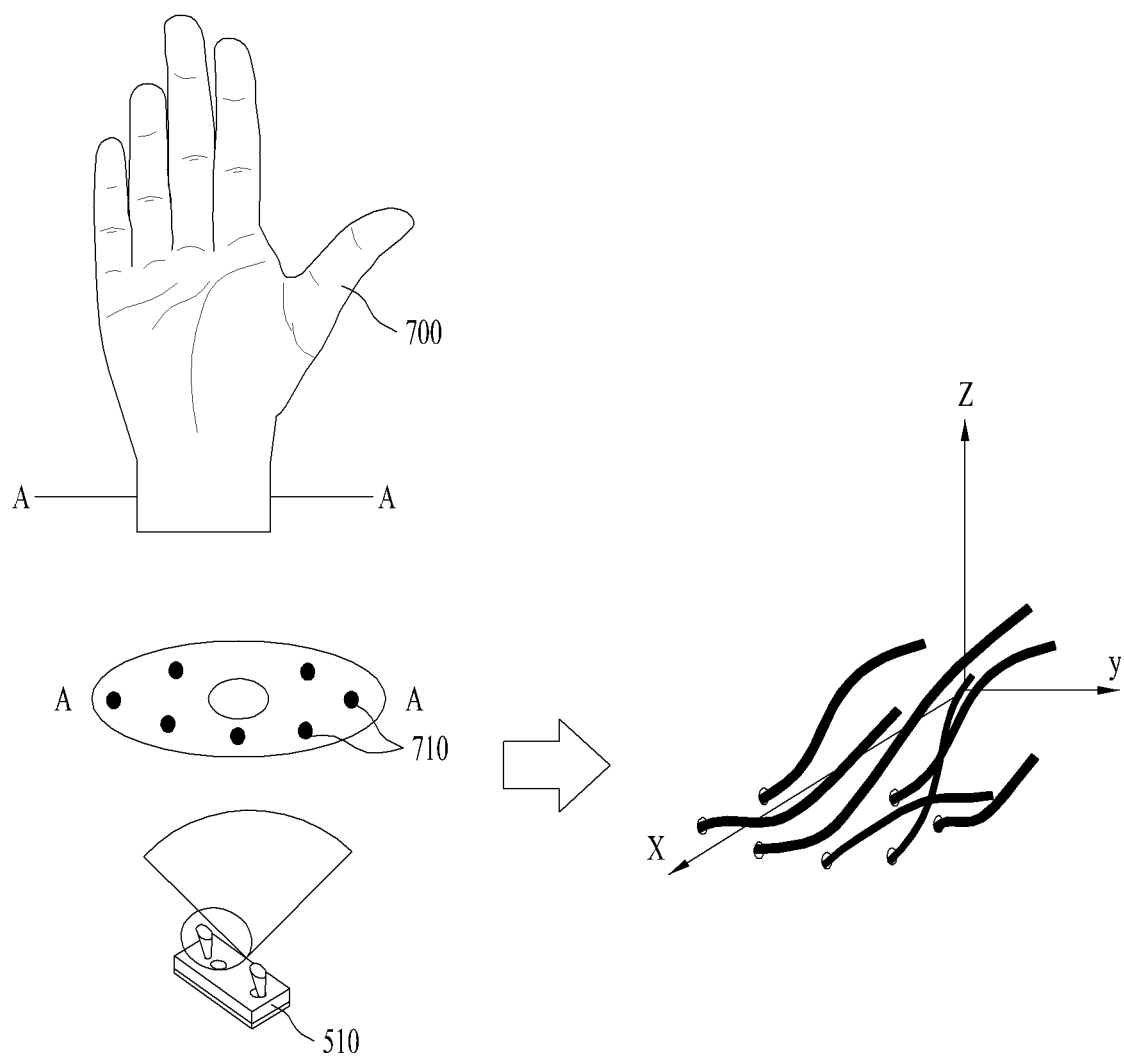
FIG. 12 is a schematic diagram illustrating a biometric authentication method in a digital device according to an embodiment of the present invention.

FIG. 12 is a schematic diagram illustrating a biometric authentication method in a digital device according to an embodiment of the present invention. Referring to FIG. 12, according to an embodiment of the present invention, if receiving a security authentication mode command, the digital device can adjust a focus lens by activating a camera unit 510 and then capture a target to authenticate as multiple layers in a plurality of distances.

Further, the camera unit 510 may include the focus lens capable of capturing a target as multiple layers in a plurality of distances and employ a ToF sensor that uses near infrared rays (NIR). The ToF sensor measures a distance from a target and represents strength of a difference of a phase signal reflecting from a target as an image form, thereby checking a vein vessel pattern 710 of a body part 700. In this instance, the vein vessel pattern 710 of the body part 700 can be embodied into a 3D image by extracting depth information.

The digital device can sense image data of the captured target and then extract depth data from the image data. The digital device can then determine whether the image data is body part vein image data. If the image data is the body part vein image data, the digital device can create processed body part vein image data from the body part vein image data.

In addition, the digital device can compare the processed body part vein image data and the corresponding depth data with at least one of a plurality of authentication body part vein image data differing from each other in depth from a skin surface and at least one of a plurality of corresponding depth data, which are stored in the memory unit. The digital device can then end the security authentication mode according to a result of the comparison.

Next, FIGS. 13 to 18 are diagrams illustrating a method of authenticating a vein of a body part according to an embodiment of the present invention. Referring to FIGS. 13 to 18, the present invention can capture vein images of various body parts per skin depth and then extract a plurality of body part vein image data from the captured images per skin depth.

Figure 13:
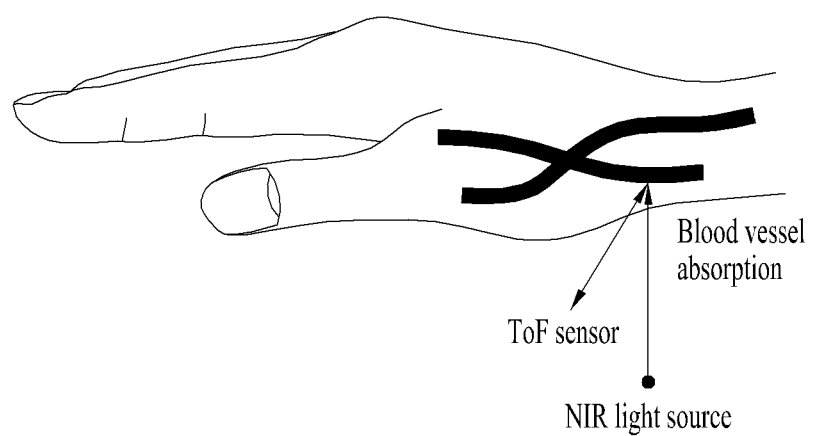
FIGS. 13 to 18 are diagrams illustrating a method of authenticating a vein of a body part according to an embodiment of the present invention.
Figure 14:
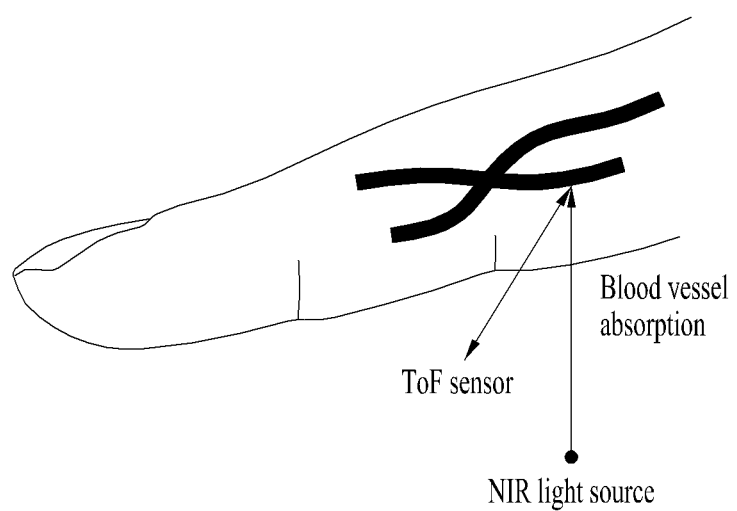
Figure 15:
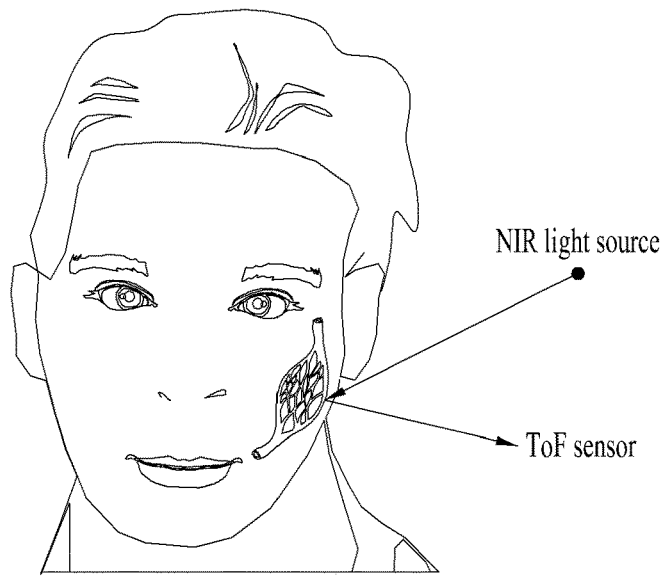

FIG. 13 shows a process for extracting wrist vein pattern information by capturing a wrist vein image per skin depth. FIG. 14 shows a process for extracting finger vein pattern information by capturing a finger vein image per skin depth. FIG. 15 shows a process for extracting face vein pattern information by capturing a face vein image per skin depth.

Figure 16:
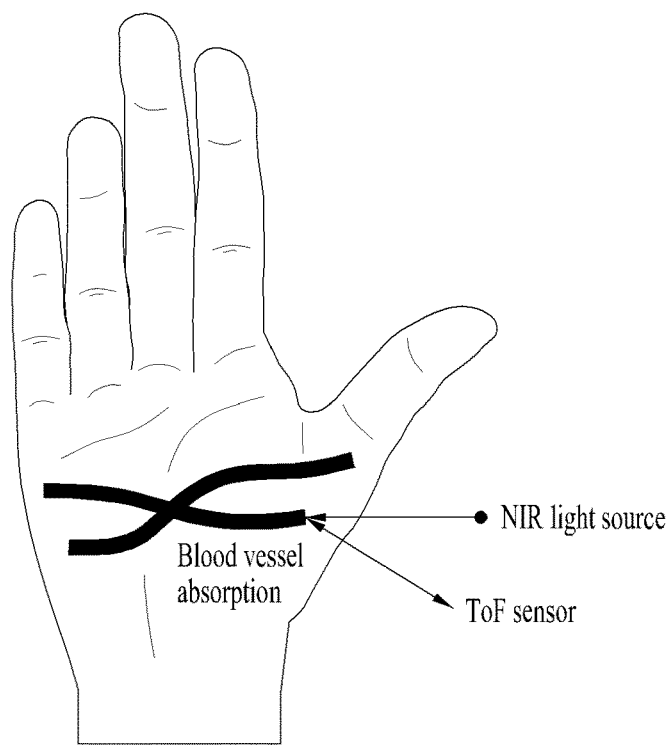
Figure 17:
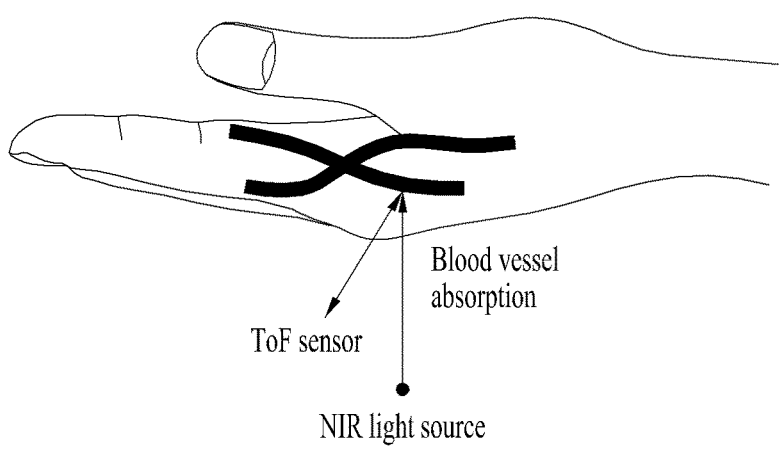
Figure 18:
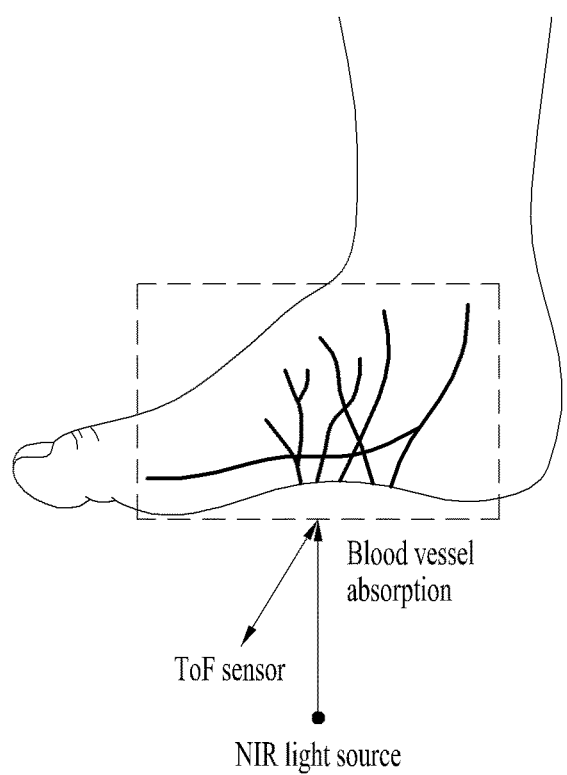

FIG. 16 shows a process for extracting palm vein pattern information by capturing a palm vein image per skin depth. FIG. 17 shows a process for extracting hand dorsum vein pattern information by capturing a hand dorsum vein image per skin depth. In addition, FIG. 18 shows a process for extracting foot vein pattern information by capturing a foot vein image per skin depth.

Therefore, the present invention can perform a first embodiment of performing face vein authentication per face skin depth, a second embodiment of performing wrist vein authentication per wrist skin depth, a third embodiment of performing hand dorsum vein authentication per hand dorsum skin depth, a fourth embodiment of performing finger vein authentication per finger skin depth, a fifth embodiment of performing palm vein authentication per palm skin depth, and a sixth embodiment of performing food vein authentication per foot skin depth.

Thus, the present invention can perform the single or multiple authentication by saving a plurality of authentication body part vein image data differing from each other in depth from a skin surface to a memory unit for security authentication and comparing processed body part vein image data with one or more of a plurality of the authentication body part vein image data differing from each other in depth from the skin surface, which are saved to the memory unit. Moreover, the present invention can reinforce security with higher accuracy by performing vein authentication once or several times based on a plurality of body part vein image data differing from each other in depth from a skin surface according to a security level.

Next, FIGS. 19 to 28 are diagrams illustrating security authentication according to security levels. Referring to FIGS. 19 to 28, the present invention can perform various authentications according to security levels of an execution mode to be executed.

In one example, if a security level of an execution mode to be executed is a low level, the present invention can perform a primary authentication of comparing processed body part vein image data with authentication body part vein image having a first depth data stored in a memory only. In another example, if a security level of an execution mode to be executed is a middle level, the present invention can perform both a primary authentication of comparing processed body part vein image data with authentication body part vein image data having a first depth data stored in the memory unit and a secondary authentication of comparing processed body part vein image data with authentication body part vein image data having a second depth data stored in the memory unit.

Further, the second depth data may include data of which depth from a skin surface is greater than that of the first depth data. In a further example, if a security level of an execution mode to be executed is a high level, the present invention can perform a primary authentication of comparing processed body part vein image data with authentication body part vein image data having a first depth data stored in the memory unit, a secondary authentication of comparing processed body part vein image data with authentication body part vein image data having a second depth data stored in the memory unit, and a tertiary authentication of comparing processed body part vein image data with authentication body part vein image data having a third depth data stored in the memory unit all.

Further, the second depth data may include data of which depth from a skin surface is greater than that of the first depth data, and the third depth data may include data of which depth from a skin surface is greater than that of the second depth data.

Figure 19:
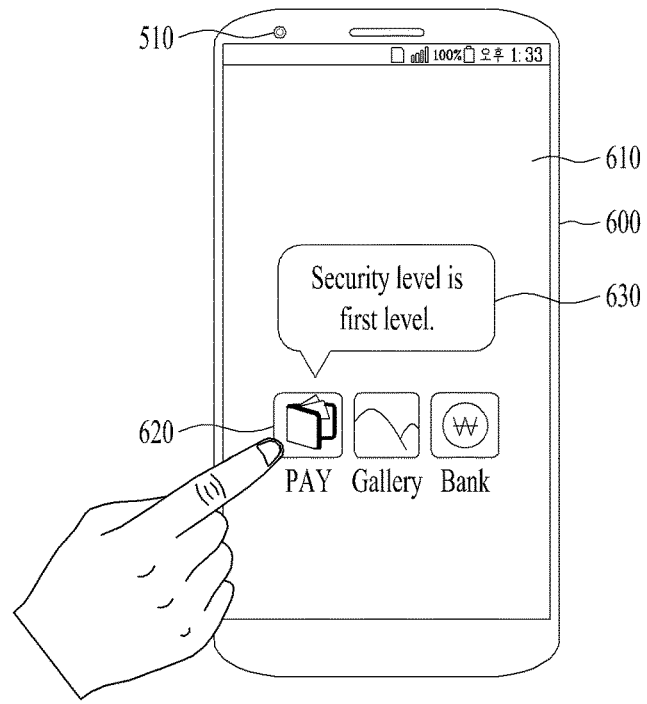
FIGS. 19 to 28 are diagrams illustrating security authentication according to security levels.

Referring to FIG. 19, if an execution mode to be executed is an electronic payment, a security level of the execution mode to be executed is checked in response to a user's touch to an electronic payment icon 620 and information on the checked security level can be provided as a notification message 630 to a display screen 610 of an electronic device 600.

Namely, the present invention checks a security level of an execution mode to be executed. If the checked security level of the execution mode to be executed is a high level like the electronic payment, the present invention can perform both a primary authentication of comparing processed body part vein image data with authentication body part vein image data having a first depth data stored in the memory unit and a secondary authentication of comparing processed body part vein image data with authentication body part vein image data having a second depth data stored in the memory unit. Further, the second depth data may include data of which depth from a skin surface is greater than that of the first depth data.

Figure 20:
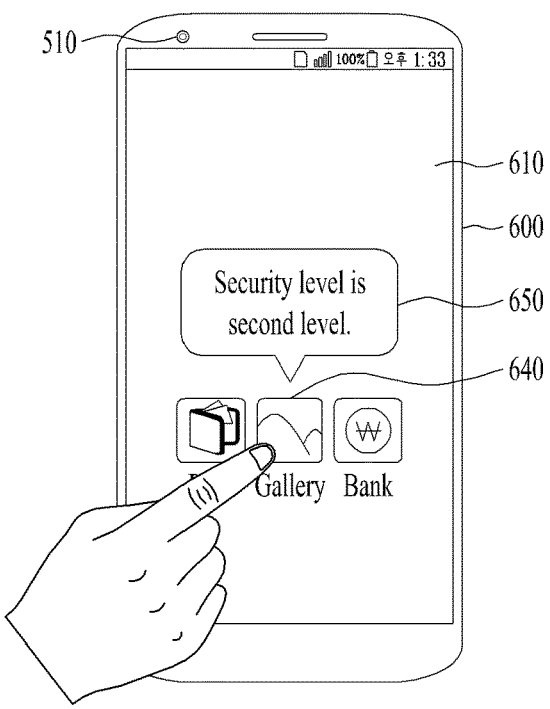

Referring to FIG. 20, if an execution mode to be executed is a photo gallery, a security level of the execution mode to be executed is checked in response to a user's touch to a photo gallery icon 640 and information on the checked security level can be provided as a notification message 650 to a display screen 610 of an electronic device 600.

Namely, the present invention checks a security level of an execution mode to be executed. If the checked security level of the execution mode to be executed is a low level like the photo gallery, the present invention can perform a primary authentication of comparing processed body part vein image data with authentication body part vein image having a first depth data stored in a memory only.

Figure 21:
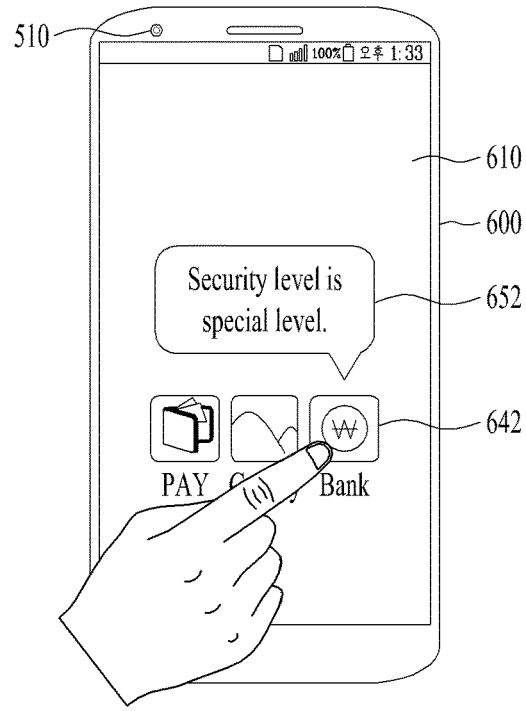

Referring to FIG. 21, if an execution mode to be executed is a bank transaction, a security level of the execution mode to be executed is checked in response to a user's touch to a bank transaction icon 642 and information on the checked security level can be provided as a notification message 652 to a display screen 610 of an electronic device 600.

Namely, if the security level of the execution mode to be executed is a high level like the bank transaction, the present invention can perform a primary authentication of comparing processed body part vein image data with authentication body part vein image data having a first depth data stored in the memory unit, a secondary authentication of comparing processed body part vein image data with authentication body part vein image data having a second depth data stored in the memory unit, and a tertiary authentication of comparing processed body part vein image data with authentication body part vein image data having a third depth data stored in the memory unit all. Further, the second depth data may include data of which depth from a skin surface is greater than that of the first depth data, and the third depth data may include data of which depth from a skin surface is greater than that of the second depth data.

Figure 22:
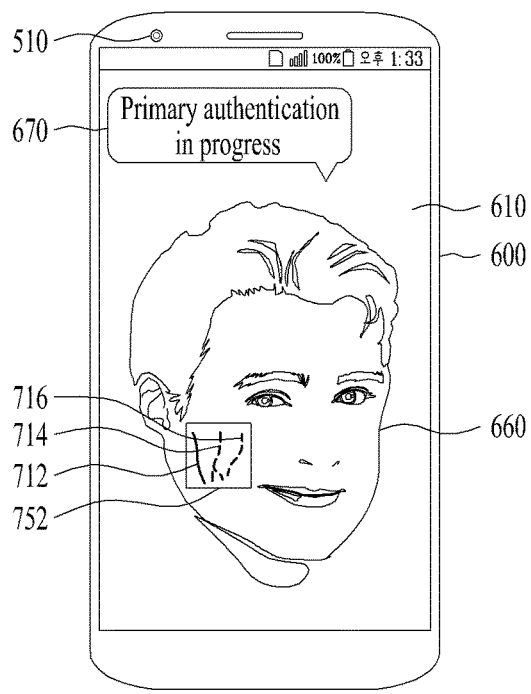
Figure 24:
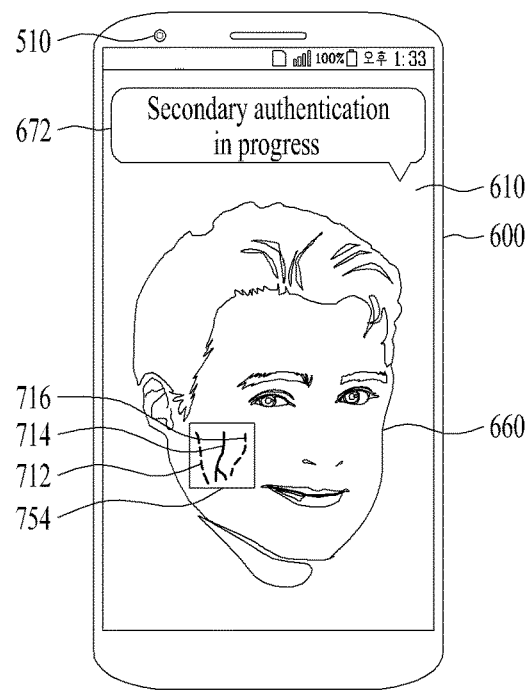
Figure 26:
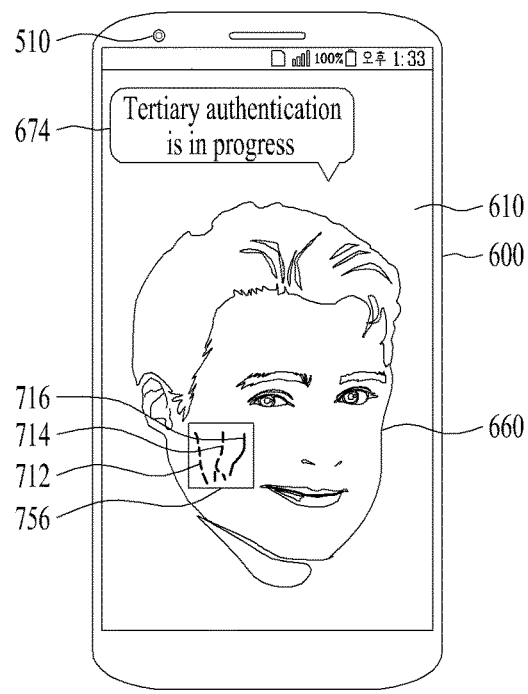

Moreover, referring to FIGS. 22, 24 and 26, when vein authentication of a body part is performed, if it is in the middle of authentication, the present invention can provide a notification message 670/672/674, which indicates that authentication is in progress, to a display screen 610 of an electronic device 600.

Figure 23:
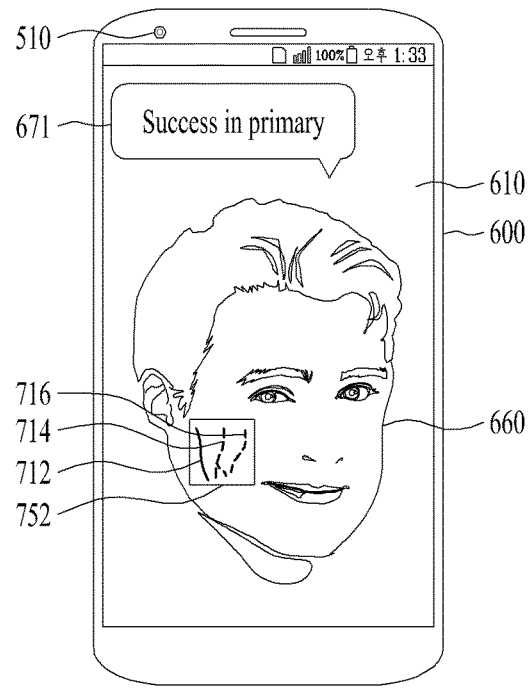
Figure 25:
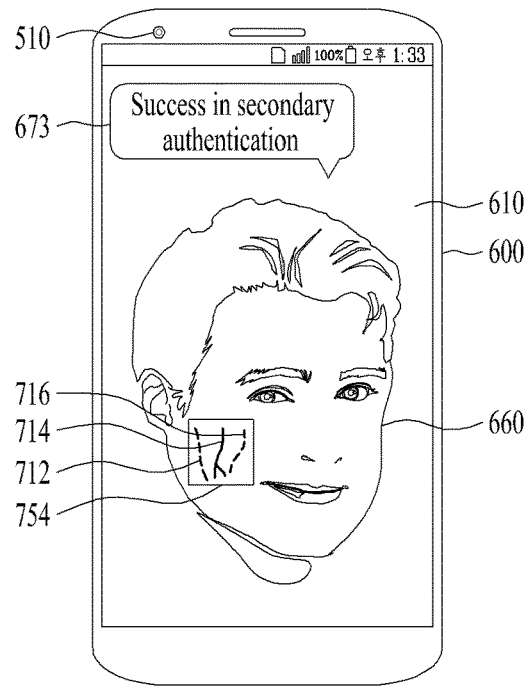
Figure 27:
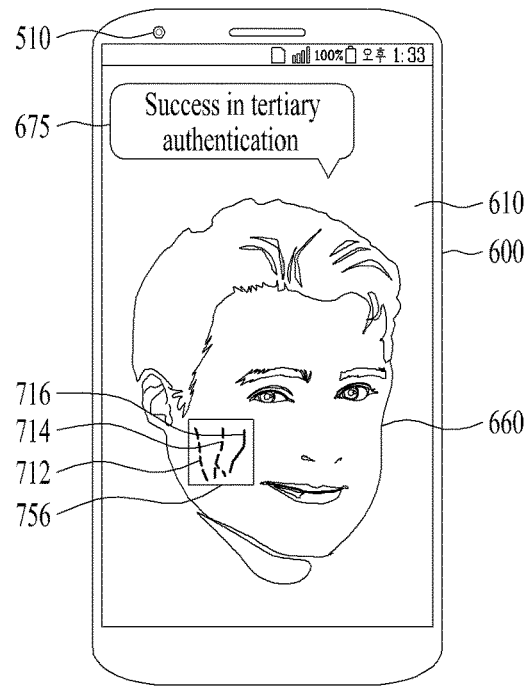
Figure 28:
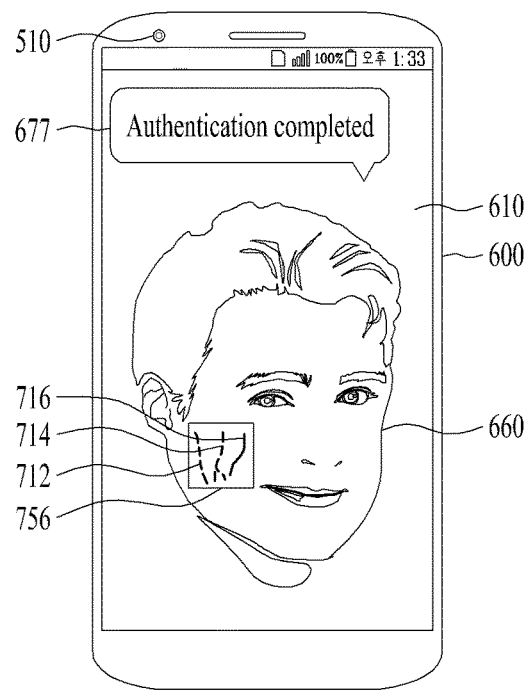

Referring to FIGS. 23, 25 and 27, if the authentication is successful, the present invention can provide an authentication success notification message 671/673/675 to a display screen 610 of an electronic device 600. Referring to FIG. 28, if it is authentication completion according to authentication success, the present invention can provide an authentication completion notification message 677 to a display screen 610 of an electronic device 600.

Figure 29:
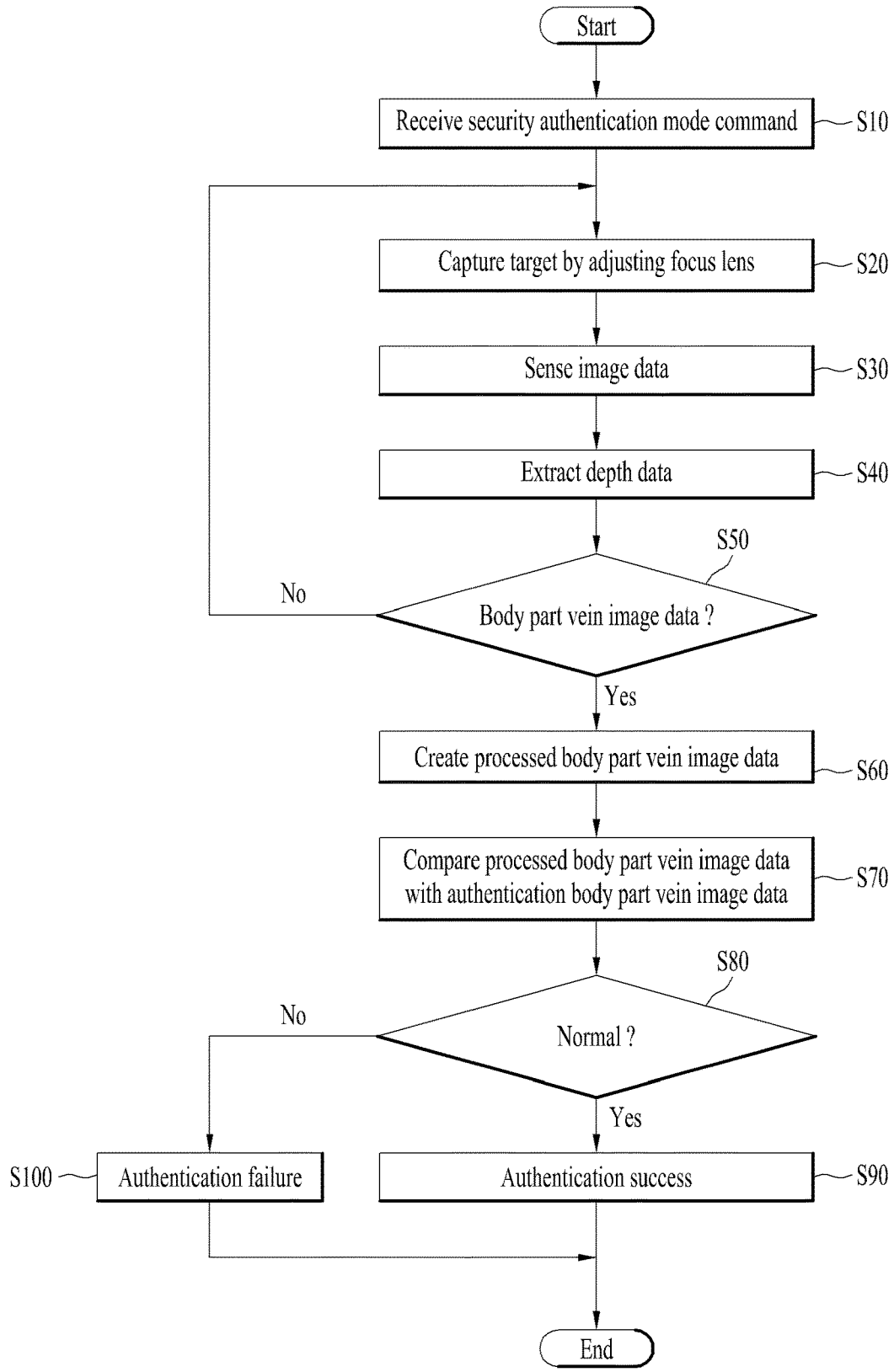
FIG. 29 is a flowchart of a biometric authentication method in a digital device according to a first embodiment of the present invention.

FIG. 29 is a flowchart of a biometric authentication method in a digital device according to a first embodiment of the present invention. Referring to FIG. 29, if receiving a security authentication mode command (S10), the present invention can adjust a focus lens by activating a camera unit and then capture a target to authenticate as multiple layers in a plurality of distances (S20).

The present invention can sense image data of the captured target (S30) and then extract depth data from the image data (S40), and determine whether the image data is body part vein image data (S50). If the image data is the body part vein image data, the present invention can create processed body part vein image data from the body part vein image data (S60).

In addition, the present invention can compare the processed body part vein image data and the corresponding depth data with at least one of a plurality of authentication body part vein image data differing from each other in depth from a skin surface and at least one of a plurality of corresponding depth data, which are stored in the memory unit (S70). As a result of the comparison, if the authentication is normal (S80), the present invention can recognize it as an authentication success and end the security authentication mode (S90). Yet, as a result of the comparison, if the authentication is not normal, the present invention can recognize it as an authentication failure and end the security authentication mode (S100).

Figure 30:
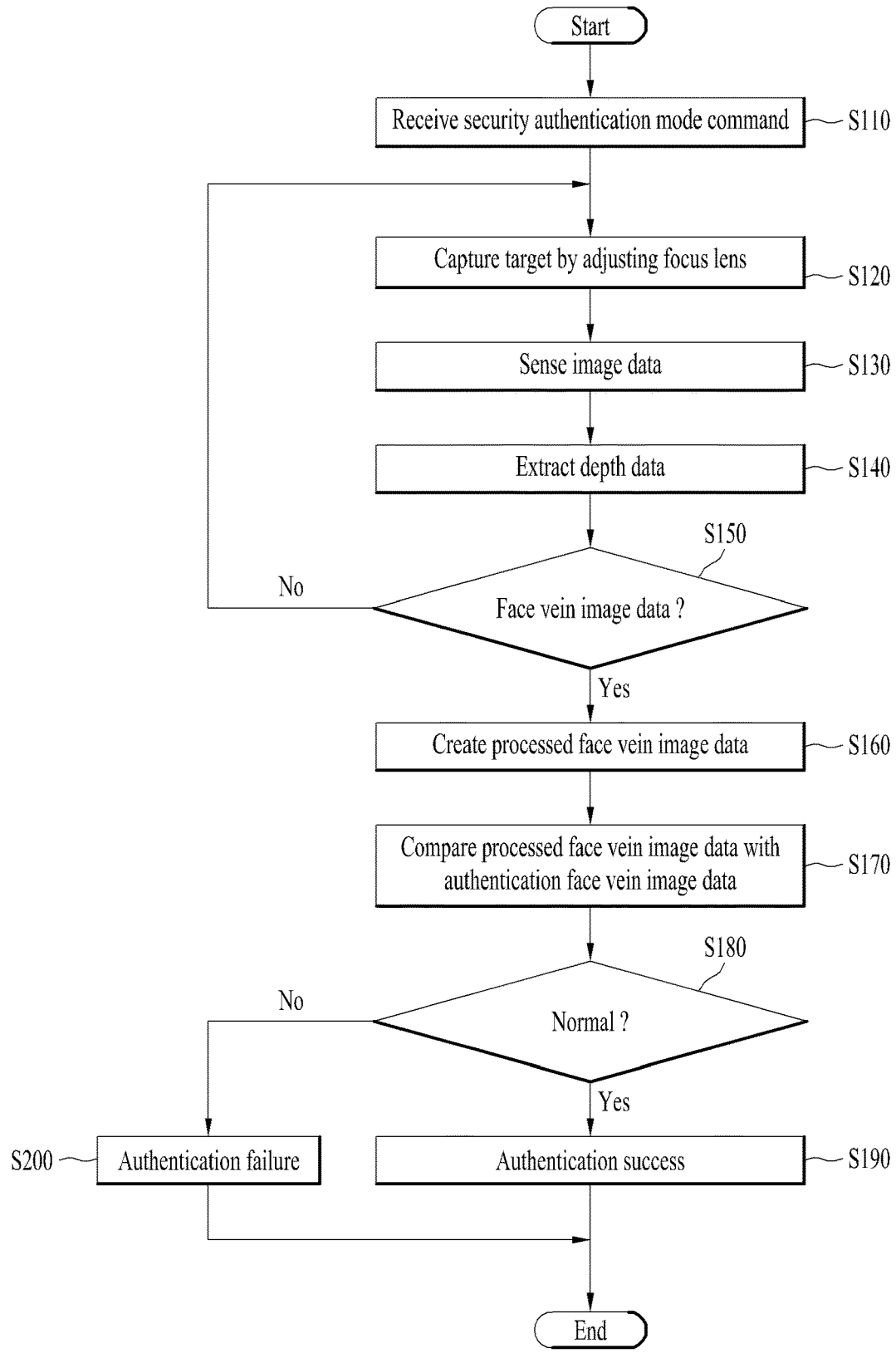
FIG. 30 is a flowchart of a biometric authentication method in a digital device according to a second embodiment of the present invention.

FIG. 30 is a flowchart of a biometric authentication method in a digital device according to a second embodiment of the present invention. Referring to FIG. 30, if receiving a security authentication mode command (S110), the present invention can adjust a focus lens by activating a camera unit and then capture a target to authenticate as multiple layers in a plurality of distances (S120).

The present invention can sense image data of the captured target (S130) and then extract depth data from the image data (S140). In addition, the present invention can determine whether the image data is face vein image data (S150). If the image data is the face vein image data, the present invention can create processed face vein image data from the face vein image data (S160).

Further, the present invention can compare the processed face vein image data and the corresponding depth data with at least one of a plurality of authentication face vein image data differing from each other in depth from a skin surface and at least one of a plurality of corresponding depth data, which are stored in the memory unit (S170). As a result of the comparison, if the authentication is normal (S180), the present invention can recognize it as an authentication success and end the security authentication mode (S190).

Yet, as a result of the comparison, if the authentication is not normal, the present invention can recognize it as an authentication failure and end the security authentication mode (S200). Accordingly, the present invention can perform personal authentication quickly and conveniently by extracting a plurality of body part vein patterns body part differing from each other in depth from a skin surface by applying ToF (time of flight) employing a near infrared light source and then using the extracted patterns.

Also, the present invention can improve safety and reliability of security authentication by performing vein authentication based on a plurality of body part image data differing from each other in depth from a skin surface. Moreover, the present invention can reinforce security with higher accuracy by performing vein authentication once or several times based on a plurality of body part image data differing from each other in depth from a skin surface according to a security level.

Furthermore, the present invention can perform personal authentication with high accuracy by obtaining 3D vein blood vessel information through depth information of a ToF sensor, compensate the inaccuracy of the related art face recognition through additional vein authentication, and apply use scenes of various types.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A digital device, comprising:
a camera unit; and
a controller configured to:
in response to a request to execute a first application on the digital device having a first security authentication level, control the camera unit to capture first vein image data at a first depth of a particular body part of a target and perform a first authentication process by comparing the captured first vein image data with prestored first vein image data, and
in response to a request to execute a second application on the digital device having a second security authentication level more secure than the first security authentication level, control the camera unit to capture second vein image data at a second depth of the particular body part of the target and perform the first authentication process and a second authentication process by comparing the captured second vein image data with prestored second vein image data,
wherein the second depth is deeper from a skin surface of the target than the first depth,
wherein the camera unit comprises:
a light emitting unit including a near infrared light source configured to emit near infrared light rays to the target, and a color light source configured to emit color light rays to the target; and
a light receiving unit configured to detect both light rays reflected from the target,
wherein the light receiving unit includes a focus lens,
wherein the controller is further configured to linearly move the focus lens to and from the target in response to an autofocus signal of the controller, and
wherein the light receiving unit further comprises:
a filter unit configured to only transmit infrared light from focused light reflected from the target; and a detecting unit configured to detect the infrared light filtered by the filter unit.

2. The digital device of claim 1, wherein the controller is further configured to use the near infrared light source when capturing the first and second vein image data.

3. The digital device of claim 1, wherein the first vein image data at the first depth corresponds to a first distance between the focus lens and the target, and the second vein image data at the second depth corresponds to a second distance between the focus lens and the target.

4. The digital device of claim 1, wherein the controller is further configured to perform autofocus by controlling a movement of the focus lens to focus on the particular body part of the target.

5. The digital device of claim 4, wherein after performing the auto focus by controlling the movement of the focus lens, the controller is further configured to perform digital zoom of enlarging a portion of the first vein image data.

6. The digital device of claim 5, wherein the controller is further configured to:
calculate a visibility of the first vein image data, and
if the calculated visibility is equal to or smaller than a preset reference value, perform the digital zoom of enlarging the portion of the first vein image data.

7. The digital device of claim 4, wherein after performing the autofocus by controlling the movement of the focus lens, the controller is further configured to perform auto zoom by enlarging a partial portion of the first vein image data.

8. The digital device of claim 1, wherein in response to a request to execute a third application on the digital device having a third security authentication level more secure than the second security authentication level, control the camera unit to capture third vein image data at a third depth of the particular body part of the target and perform the first and second authentication processes and a third authentication process by comparing the captured third vein image data with prestored third vein image data.

9. The digital device of claim 8, wherein the third depth is greater than the second depth.

10. The digital device of claim 1, wherein the first and second vein image data comprises at least one of face vein image data, wrist vein image data, hand dorsum vein image data, finger vein image data, palm vein image data, and foot vein image data.

11. A method of controlling a digital device, the method comprising:
in response to a request to execute a first application on the digital device having a first security authentication level, controlling a camera unit to capture first vein image data at a first depth of a particular body part of a target and performing a first authentication process by comparing the captured first vein image data with prestored first vein image data; and
in response to a request to execute a second application on the digital device having a second security authentication level more secure than the first security authentication level, controlling the camera unit to capture second vein image data at a second depth of the particular body part of the target and performing the first authentication process and a second authentication process by comparing the captured second vein image data with prestored second vein image data,
wherein the second depth is deeper from a skin surface of the target than the first depth,
wherein the camera unit comprises:
a light emitting unit including a near infrared light source configured to emit near infrared light rays to the target, and a color light source configured to emit color light rays to the target; and
a light receiving unit configured to detect both light rays reflected from the target,
wherein the light receiving unit includes a focus lens, and
wherein the method further comprises linearly moving, via the controller, the focus lens to and from the target in response to an autofocus signal of the controller, and
wherein the light receiving unit further comprises:
a filter unit configured to only transmit infrared light from the focused light reflected from the target; and
a detecting unit configured to detect the infrared light filtered by the filter unit.

12. The method of claim 11, further comprising:
using the near infrared light source when capturing the first and second vein image data.

13. The method of claim 11, wherein the first vein image data at the first depth corresponds to a first distance between the focus lens and the target, and the second vein image data at the second depth corresponds to a second distance between the focus lens and the target.

* * * * *